US012619034B2

(12) United States Patent
Yakabe et al.

(10) Patent No.: US 12,619,034 B2
(45) Date of Patent: May 5, 2026

(54) FERRULE, OPTICAL CONNECTOR, AND OPTICAL CONNECTION STRUCTURE

(71) Applicants: SUMITOMO ELECTRIC INDUSTRIES, LTD., Osaka (JP); NIPPON TSUSHIN DENZAI CO., LTD., Komaki (JP)

(72) Inventors: Sho Yakabe, Osaka (JP); Yuto Fujihara, Osaka (JP); Dai Sasaki, Osaka (JP); Motoyoshi Kimura, Komaki (JP); Manabu Izaki, Komaki (JP)

(73) Assignees: SUMITOMO ELECTRIC INDUSTRIES, LTD., Osaka (JP); NIPPON TSUSHIN DENZAI CO., LTD., Komaki (JP)

( * ) Notice: Subject to any disclaimer, the term of this patent is extended or adjusted under 35 U.S.C. 154(b) by 273 days.

(21) Appl. No.: 18/023,901

(22) PCT Filed: Sep. 17, 2021

(86) PCT No.: PCT/JP2021/034368
§ 371 (c)(1),
(2) Date: Feb. 28, 2023

(87) PCT Pub. No.: WO2022/065245
PCT Pub. Date: Mar. 31, 2022

(65) Prior Publication Data
US 2023/0324632 A1 Oct. 12, 2023

(30) Foreign Application Priority Data
Sep. 25, 2020 (JP) ................................. 2020-161212

(51) Int. Cl.
*G02B 6/40* (2006.01)
*G02B 6/38* (2006.01)

(52) U.S. Cl.
CPC ........... *G02B 6/403* (2013.01); *G02B 6/3825* (2013.01); *G02B 6/3834* (2013.01)

(58) Field of Classification Search
CPC ........ G02B 6/3873–3886; G02B 6/403; G02B 6/3893; G02B 6/3825
See application file for complete search history.

(56) References Cited

U.S. PATENT DOCUMENTS 3,846,010 A * 11/1974 Love ...................... G02B 6/403
385/54
5,588,079 A * 12/1996 Tanabe ................. G02B 6/3869
385/78
(Continued)

FOREIGN PATENT DOCUMENTS

CN 110173669 A 8/2019
EP 2 075 084 A2 7/2009
(Continued)

*Primary Examiner* — Rhonda S Peace
(74) *Attorney, Agent, or Firm* — Oliff PLC

(57) ABSTRACT

A ferrule includes an optical fiber holding portion configured to hold a plurality of optical fibers, and a first side surface and a second side surface facing each other in a second direction intersecting a first direction in which the optical fiber holding portion extends. The first side surface is provided with a first recessed portion or a first protruding portion extending along the first direction. The second side surface is provided with a second recessed portion or a second protruding portion extending along the first direction. In this ferrule, the first recessed portion or the first protruding portion includes a first positioning portion and a second positioning portion separated from each other in the first direction.

19 Claims, 11 Drawing Sheets

(56) References Cited

U.S. PATENT DOCUMENTS

| | | | | |
|---|---|---|---|---|
| 5,737,463 | A * | 4/1998 | Weiss | G02B 6/3839 |
| | | | | 385/59 |
| 5,815,621 | A * | 9/1998 | Sakai | G02B 6/3834 |
| | | | | 264/1.24 |
| 5,896,479 | A * | 4/1999 | Vladic | G02B 6/3839 |
| | | | | 385/59 |
| 6,045,270 | A * | 4/2000 | Weiss | G02B 6/3825 |
| | | | | 385/59 |
| 6,398,424 | B1 * | 6/2002 | Jin | G02B 6/4249 |
| | | | | 385/59 |
| 6,474,878 | B1 * | 11/2002 | Demangone | G02B 6/3839 |
| | | | | 385/78 |
| 6,786,649 | B2 * | 9/2004 | Sherrer | G02B 6/3838 |
| | | | | 385/83 |
| 7,841,778 | B2 * | 11/2010 | Nishimura | G02B 6/3839 |
| | | | | 385/59 |
| 8,764,313 | B2 * | 7/2014 | Arishima | G02B 6/3893 |
| | | | | 385/76 |
| 9,823,424 | B2 * | 11/2017 | Krawczyk | G02B 6/3821 |
| 11,016,251 | B2 * | 5/2021 | Childers | G02B 6/3857 |
| 11,215,763 | B2 * | 1/2022 | Takai | F16F 1/04 |
| 2010/0158447 | A1 * | 6/2010 | Nishimura | G02B 6/3885 |
| | | | | 385/71 |
| 2020/0371298 | A1 | 11/2020 | Nakama et al. | |
| 2023/0141449 | A1 * | 5/2023 | Yakabe | G02B 6/3874 |
| | | | | 385/79 |
| 2023/0324632 | A1 * | 10/2023 | Yakabe | G02B 6/403 |
| | | | | 385/79 |

FOREIGN PATENT DOCUMENTS

| | | |
|---|---|---|
| JP | 2002-507761 A | 3/2002 |
| JP | 2004-012624 A | 1/2004 |
| JP | 2011-028181 A | 2/2011 |
| JP | 2015-203858 A | 11/2015 |
| JP | 2017-116601 A | 6/2017 |
| JP | 2019-090974 A | 6/2019 |
| WO | 99/47958 A1 | 9/1999 |

* cited by examiner

FERRULE, OPTICAL CONNECTOR, AND OPTICAL CONNECTION STRUCTURE

TECHNICAL FIELD

The present disclosure relates to a ferrule, an optical connector, and an optical connection structure. The present application claims priority based on Japanese Patent Application No. 2020-161212 filed on Sep. 25, 2020, the entire contents of which are incorporated herein by reference.

BACKGROUND ART

Patent Literature 1 discloses a technique for aligning a plurality of optical fibers with each other using a guide pin. In this technique, one end portions of a pair of guide pins are respectively inserted into a pair of guide pin insertion holes provided in a distal end surface of a ferrule, and the other ends of the pair of guide pins are respectively inserted into a pair of guide pin insertion holes provided in a distal end surface of a ferrule as a connection counterpart. As a result, the plurality of optical fibers are aligned with each other (that is, alignment between the plurality of optical fibers and the plurality of optical fiber as a connection counterpart).

CITATION LIST

Patent Literature

Patent Literature 1: Japanese Unexamined Patent Publication No. 2019-90974

SUMMARY OF INVENTION

The present disclosure provides, as an aspect, a ferrule. The ferrule includes an optical fiber holding portion configured to hold a plurality of optical fibers, and a first side surface and a second side surface facing each other in a second direction intersecting a first direction in which the optical fiber holding portion extends. The first side surface is provided with a first recessed portion or a first protruding portion extending along the first direction. The second side surface is provided with a second recessed portion or a second protruding portion extending along the first direction. The first recessed portion or the first protruding portion includes a first positioning portion and a second positioning portion separated from each other in the first direction.

The present disclosure provides, as another aspect, an optical connector. The optical connector includes the ferrule described above, and the plurality of optical fibers held in the optical fiber holding portion.

The present disclosure provides, as still another aspect, an optical connection structure. The optical connection structure includes a plurality of optical fibers, a ferrule holding the plurality of optical fibers, and an adapter. The adapter includes a tubular shape and is configured such that the ferrule is inserted and fitted into the adapter such that the ferrule and another ferrule as a connection object face each other inside the tubular shape. The ferrule includes a first side surface and a second side surface facing each other in a second direction intersecting a first direction in which the ferrule is inserted into the adapter. The first side surface is provided with a first recessed portion or a first protruding portion extending along the first direction. The second side surface is provided with a second recessed portion or a second protruding portion extending along the first direction. The adapter includes an inner surface provided with a third protruding portion fittable with the first recessed portion or a third recessed portion fittable with the first protruding portion, and a fourth protruding portion fittable with the second recessed portion or a fourth recessed portion fittable with the second protruding portion. In the optical connection structure, the first recessed portion or the first protruding portion includes a first positioning portion and a second positioning portion separated from each other in the first direction, and the second recessed portion or the second protruding portion includes a third positioning portion and a fourth positioning portion separated from each other in the first direction, or the third protruding portion or the third recessed portion includes a first positioning portion and a second positioning portion separated from each other in the first direction, and the fourth protruding portion or the fourth recessed portion includes a third positioning portion and a fourth positioning portion separated from each other in the first direction.

DESCRIPTION OF EMBODIMENT

Technical Problem

Figure 1:
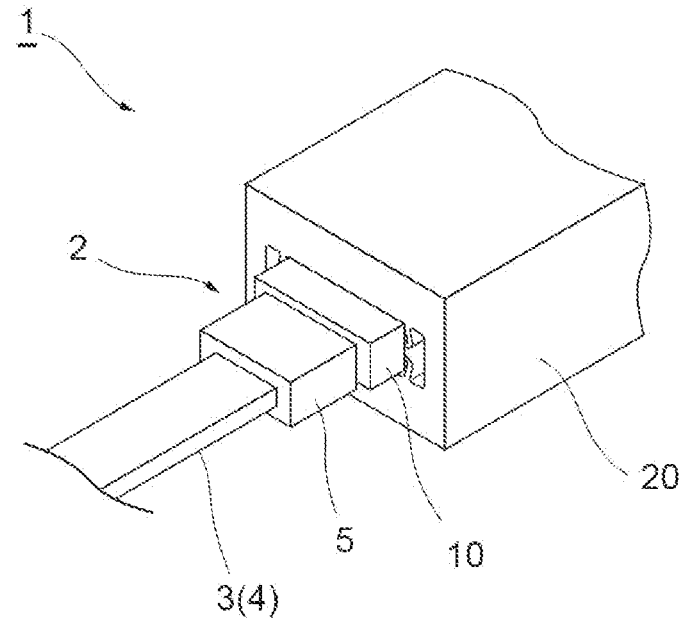
FIG. 1 is a perspective view illustrating a state in which an optical connector is attached to an adapter in an optical connection structure according to an embodiment.
Figure 1:
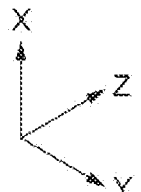

As the technique disclosed in Patent Literature 1, in a case where a plurality of optical fibers are positioned with each other using guide pins and a ferrule provided with guide pin insertion holes, the following problem may occur. For example, in order to highly accurately position the plurality of optical fibers with each other, a guide pin having high dimensional accuracy is required so that the clearance with the guide pin insertion hole is as small as possible. Moreover, when cleaning the ferrule in which the guide pin is inserted into the guide pin insertion hole, foreign matter such as dust near the guide pin cannot be completely removed in some cases. In this case, the foreign matter may hinder the positioning accuracy between the plurality of optical fibers and decrease the positioning accuracy, and the connection loss may increase.

According to a ferrule, an optical connector, and an optical connection structure according to the present disclosure, a plurality of optical fibers can be easily positioned with a simple configuration.

Description of Embodiment of Present Disclosure

First, contents of an embodiment of the present disclosure will be listed and described. A ferrule according to an embodiment of the present disclosure includes an optical fiber holding portion configured to hold a plurality of optical fibers, and a first side surface and a second side surface facing each other in a second direction intersecting a first direction in which the optical fiber holding portion extends. The first side surface is provided with a first recessed portion or a first protruding portion extending along the first direction. The second side surface is provided with a second recessed portion or a second protruding portion extending along the first direction. The first recessed portion or the first protruding portion includes a first positioning portion and a second positioning portion separated from each other in the first direction.

In this ferrule, the first side surface is provided with the first recessed portion or the first protruding portion, and the second side surface is provided with the second recessed portion or the second protruding portion. When the ferrule is inserted into the adapter having an inner surface corresponding to this shape, the first recessed portion or the first protruding portion and the second recessed portion or the second protruding portion are caused to be fitted on the inner surface of the adapter, so that the position of the ferrule (that is, the positions of the plurality of optical fibers held in the ferrule) with respect to the adapter can be defined in a plane perpendicular to the first direction. That is, according to this ferrule configuration, by using the adapter into which the ferrule is inserted and fitted as a positioning member when the plurality of optical fibers are positioned, the plurality of optical fibers can be positioned without providing a guide pin insertion hole in the ferrule. As a result, it is not necessary to use a guide pin having high dimensional accuracy for positioning the plurality of optical fibers with each other. Furthermore, it is possible to avoid a situation in which the positioning accuracy between the plurality of optical fibers decreases due to the use of the guide pin to which foreign matter adheres, so that a decrease in connection loss can be suppressed.

Furthermore, more specifically, in this ferrule, the first side surface is provided with the first positioning portion and the second positioning portion that come into contact with the inner surface of the adapter to position the ferrule with respect to the adapter so as to be separated from each other on the first side surface, and the ferrule is positioned by these portions. According to this configuration, not the entire first side surface but limited portions such as the first positioning portion and the second positioning portion are brought into contact with the inner surface of the adapter to perform positioning. Therefore, it is sufficient that only these positioning portions are formed with high dimensional accuracy, and the optical fibers held in the ferrule can be positioned with high accuracy without forming the entire first side surface with high dimensional accuracy. That is, in this ferrule, by forming at least two portions separated from each other such as the positioning portions with high dimensional accuracy, it is possible to easily manage the inclination, positional displacement, or the like of the ferrule at the time of fitting the ferrule into the adapter. Note that the ferrule for the optical connector may be manufactured by, for example, injection molding or the like, and in some cases, the ferrule may be partially contracted after molding. Accordingly, in some cases, it may be difficult to manufacture the entire first side surface including a continuous V groove or the like with high dimensional accuracy. However, as described above, a portion where the dimensional accuracy is enhanced is limited by forming parts of the first side surface as the positioning portions that come into contact with the inner surface of the adapter. As a result, even in a case where the ferrule is manufactured by injection molding or the like, it is possible to easily manufacture the ferrule that can be highly accurately positioned with respect to the adapter. As described above, according to the ferrule described above, the plurality of optical fibers can be easily positioned with a simple configuration.

As an embodiment, the first recessed portion or the first protruding portion may further include a first stepped portion located between the first positioning portion and the second positioning portion and extending along the first direction. The first stepped portion may be recessed inward of the ferrule with respect to a surface of the first positioning portion and a surface of the second positioning portion. According to this embodiment, the first positioning portion and the second positioning portion are reliably brought into contact with the inner surface of the adapter, and the ferrule can be easily positioned. Furthermore, even if the first stepped portion does not have high dimensional accuracy, it is possible to eliminate the influence on positioning by the first positioning portion and the second positioning portion. Note that, in this embodiment, the first stepped portion may be recessed in a range of 0.005 mm or more and 2 mm or less with respect to the surface of the first positioning portion and the surface of the second positioning portion.

As an embodiment, the first positioning portion and the second positioning portion may be separated from each other in the first direction by a distance of 1 mm or more and 10 mm or less. According to this embodiment, the first positioning portion and the second positioning portion are located to be separated from each other by 1 mm or more and come into contact with the inner surface of the adapter in this state. Accordingly, the ferrule can be more accurately positioned with respect to the adapter as compared with a case where both the positioning portions are close to each other (a case where the positioning portions are closer than 1 mm) Furthermore, by setting the separation distance between the first positioning portion and the second positioning portion to 10 mm or less, it is possible to make the ferrule compact without increasing the size. Note that the separation distance here is the shortest separation distance between the first positioning portion and the second positioning portion, that is, a distance between an end of the first positioning portion closer to the second positioning portion and an end of the second positioning portion closer to the first positioning portion.

As an embodiment, the first positioning portion and the second positioning portion may be formed inward so as to be separated from an adjacent end surface of the ferrule or an adjacent flange portion of the ferrule in the first direction by at least 0.1 mm or more. According to this embodiment, when the ferrule is inserted into or removed from the adapter, it is possible to prevent the first positioning portion or the second positioning portion from hindering such an operation, and to perform a smooth insertion and removal operation.

As an embodiment, the first positioning portion and the second positioning portion may each have a width of 0 5 mm or more and 3 mm or less along the first direction. According to this embodiment, when the ferrule is inserted into the adapter, the first positioning portion and the second positioning portion can be more reliably brought into contact with the inner surface of the adapter, so that the ferrule can be more accurately positioned with respect to the adapter by the first positioning portion and the second positioning portion.

As an embodiment, the first positioning portion and the second positioning portion may each have a V shape or a U shape in a cross section perpendicular to the first direction in a case of the first recessed portion, and have a semicircular protrusion shape or an elliptical protrusion shape in a case of the first protruding portion. According to this embodiment, the shape of the first positioning portion and the second positioning portion can be made simple, and furthermore, the dimensional accuracy of the first positioning portion and the second positioning portion can be easily enhanced because of the simple configuration.

As an embodiment, the second recessed portion or the second protruding portion may include a third positioning portion and a fourth positioning portion separated from each other in the first direction, and a second stepped portion located between the third positioning portion and the fourth positioning portion and extending along the first direction. The second stepped portion may be recessed inward of the ferrule with respect to a surface of the third positioning portion and a surface of the fourth positioning portion. According to this embodiment, similarly to the first side surface, also in the second side surface, not the entire second side surface but limited portions such as the third positioning portion and the fourth positioning portion are brought into contact with the inner surface of the adapter to perform positioning. Therefore, it is sufficient that only these positioning portions are formed with high dimensional accuracy, and the optical fibers held in the ferrule can be positioned with high accuracy without forming the entire second side surface with high dimensional accuracy. Furthermore, even in a case where this ferrule is manufactured by, for example, injection molding or the like, a portion where the dimensional accuracy is enhanced is limited by forming parts of the second side surface as the positioning portions that come into contact with the inner surface of the adapter. Accordingly, it is possible to easily manufacture the ferrule that can be highly accurately positioned with respect to the adapter. Furthermore, similarly to the first stepped portion, even if the second stepped portion does not have high dimensional accuracy, it is possible to eliminate the influence on positioning by the third positioning portion and the fourth positioning portion.

In the embodiment described above, arrangement positions of the third positioning portion and the fourth positioning portion on the second recessed portion or the second protruding portion in the first direction may correspond to arrangement positions of the first positioning portion and the second positioning portion on the first recessed portion or the first protruding portion in the first direction. In this case, when the ferrule is inserted into the adapter and positioned, the ferrule can be more accurately positioned by improving the balance between the left and right. Note that the arrangement positions of the third positioning portion and the fourth positioning portion correspond to the arrangement positions of the first positioning portion and the second positioning portion means that, as an example, the arrangement positions of the third positioning portion and the fourth positioning portion and the arrangement positions of the first positioning portion and the second positioning portion are provided at the same place in the first direction.

As an embodiment, the ferrule may further include a first end surface and a second end surface facing each other in the first direction. The first end surface may be provided with a plurality of lenses or a plurality of through holes corresponding to the plurality of optical fibers. The second end surface may be provided with an opening into which the plurality of optical fibers are collectively insertable. According to this embodiment, the ferrule can be positioned with respect to the adapter with a simpler configuration. Note that this ferrule may have a configuration in which the first end surface is not provided with a positioning pin hole for positioning the ferrule with respect to another ferrule as a connection object.

An optical connector according to an embodiment of the present disclosure includes the ferrule according to any one of embodiments described above, and the plurality of optical fibers held in the optical fiber holding portion. According to this optical connector, it is possible to acquire operations and effects similar to those of each embodiment of the ferrule described above.

An optical connection structure according to an embodiment of the present disclosure includes a plurality of optical fibers, a ferrule that holds the plurality of optical fibers, and an adapter. The adapter includes a tubular shape and is configured such that the ferrule is inserted and fitted into the adapter such that the ferrule and another ferrule as a connection object face each other inside the tubular shape. The ferrule includes a first side surface and a second side surface facing each other in a second direction intersecting a first direction in which the ferrule is inserted into the adapter. The first side surface is provided with a first recessed portion or a first protruding portion extending along the first direction. The second side surface is provided with a second recessed portion or a second protruding portion extending along the first direction. The adapter includes an inner surface provided with a third protruding portion fittable with the first recessed portion or a third recessed portion fittable with the first protruding portion, and a fourth protruding portion fittable with the second recessed portion or a fourth recessed portion fittable with the second protruding portion. In the optical connection structure, the first recessed portion or the first protruding portion includes a first positioning portion and a second positioning portion separated from each other in the first direction, and the second recessed portion or the second protruding portion includes a third positioning portion and a fourth positioning portion separated from each other in the first direction, or the third protruding portion or the third recessed portion includes a first positioning portion and a second positioning portion separated from each other in the first direction, and the fourth protruding portion or the fourth recessed portion includes a third positioning portion and a fourth positioning portion separated from each other in the first direction.

According to the optical connection structure described above, similarly to each embodiment of the ferrule described above, the plurality of optical fibers can be positioned with a simple configuration.

As an embodiment of the optical connection structure described above, in a case where the first recessed portion or the first protruding portion includes the first positioning portion and the second positioning portion separated from each other in the first direction, and the second recessed portion or the second protruding portion includes the third positioning portion and the fourth positioning portion separated from each other in the first direction, the first recessed portion or the first protruding portion may further include a stepped portion located between the first positioning portion and the second positioning portion and extending along the first direction. The stepped portion may be recessed inward of the ferrule with respect to a surface of the first positioning portion and a surface of the second positioning portion. According to this embodiment, the first positioning portion and the second positioning portion are reliably brought into contact with the inner surface of the adapter, and the ferrule can be easily positioned.

As an embodiment of the optical connection structure described above, in a case where the first recessed portion or the first protruding portion includes the first positioning portion and the second positioning portion separated from each other in the first direction, and the second recessed portion or the second protruding portion includes the third positioning portion and the fourth positioning portion separated from each other in the first direction, in a plane perpendicular to the first direction, the first positioning portion and the second positioning portion may be contactable with the third protruding portion or the third recessed portion, and the third positioning portion and the fourth positioning portion may be contactable with the fourth protruding portion or the fourth recessed portion. According to this embodiment, positioning of the ferrule with respect to the adapter can be achieved with a simple configuration.

As an embodiment of the optical connection structure described above, in a case where the first recessed portion or the first protruding portion includes the first positioning portion and the second positioning portion separated from each other in the first direction, and the second recessed portion or the second protruding portion includes the third positioning portion and the fourth positioning portion separated from each other in the first direction, at least one of the third protruding portion or the third recessed portion and the fourth protruding portion or the fourth recessed portion may be configured to be elastically deformable in the second direction. According to this embodiment, the ferrule is easily inserted into the adapter, so that workability when the ferrule is inserted into the adapter is improved. Furthermore, when the ferrule is inserted into the adapter, in a case where the first recessed portion or the first protruding portion and the second recessed portion or the second protruding portion respectively abut on the third protruding portion or the third recessed portion and the fourth protruding portion or the fourth recessed portion, a force of at least one of the third protruding portion or the third recessed portion and the fourth protruding portion or the fourth recessed portion trying to return to the original position is applied to the ferrule. As a result, the ferrule is sandwiched and fixed by the third protruding portion or the third recessed portion and the fourth protruding portion or the fourth recessed portion, so that the positional displacement of the ferrule with respect to the adapter is suppressed. As a result, the plurality of optical fibers can be positioned with high accuracy.

Details of Embodiment of Present Disclosure

Hereinafter, an embodiment of the present disclosure will be described in detail with reference to the accompanying drawings. The present invention is not limited to these examples, but is indicated by the claims, and is intended to include any modifications within the meaning and scope equivalent to the claims In the following description, the same reference numerals will be used for the same elements or elements having the same functions, and redundant description will be omitted.

Figure 2:
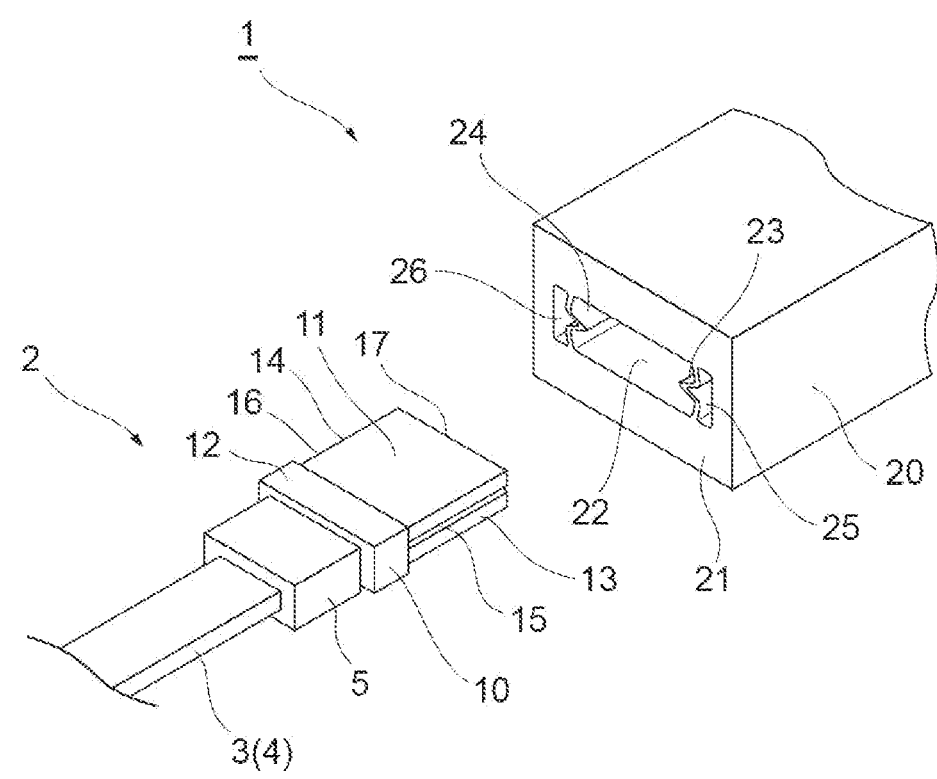
FIG. 2 is a perspective view illustrating a state in which the optical connector is detached from the adapter in the optical connection structure illustrated in FIG. 1.
Figure 2:
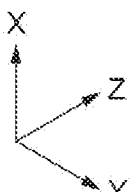

FIG. 1 is a perspective view illustrating a state in which an optical connector 2 is attached to an adapter 20 in an optical connection structure 1. FIG. 2 is a perspective view illustrating a state in which the optical connector 2 is detached from the adapter 20 in the optical connection structure 1. FIGS. 1 and 2 illustrate an XYZ orthogonal coordinate system for easy understanding. The same applies to other drawings. In the present embodiment, a longitudinal direction of the optical connector 2, which is a direction in which the optical connector 2 is inserted into the adapter 20, is defined as a Z direction (first direction), a lateral direction of the optical connector 2 is defined as a Y direction (second direction), and a height direction of the optical connector 2 is defined as an X direction (third direction).

As illustrated in FIGS. 1 and 2, the optical connection structure 1 includes the optical connector 2 including a ferrule 10, and the adapter 20 into and from which the optical connector 2 is insertable and removable. The optical connector 2 includes an optical fiber ribbon 4 that houses a plurality of optical fibers 3, a boot 5, and the ferrule 10 attached to a distal end portion of the optical fiber ribbon 4 with the boot 5. The respective optical fibers 3 of the optical fiber ribbon 4 extend along the Z direction and are arranged side by side along the Y direction intersecting (for example, orthogonal to) the Z direction. The optical fiber ribbon 4 may have a configuration in which the plurality of optical fibers 3 are arranged inside the optical fiber ribbon 4 so as to overlap with each other in a plurality of stages. The plurality of optical fibers 3 are inserted along the Z direction into a plurality of optical fiber grooves (see FIG. 4 described later) or a plurality of optical fiber holding holes formed inside the ferrule 10, and held.

The ferrule 10 has, for example, a substantially rectangular parallelepiped appearance, and is a member for accommodating the plurality of optical fibers 3 therein, and optically coupling the respective optical fibers 3 to other plurality of optical fibers held in a ferrule (not illustrated) of another optical connector. The ferrule 10 is insertable into and removable from the adapter 20 along the Z direction so as to perform this optical coupling. Note that the another optical connector can have a configuration similar to that of the optical connector 2. The ferrule 10 includes a main body portion 11 and a flange portion 12. The flange portion 12 is formed to be larger than the main body portion 11 in cross-sectional shape along an XY plane.

The main body portion 11 is provided with recessed portions 15 and 16 (a first recessed portion and a second recessed portion) on both side surfaces 13 and 14, and these recessed portions 15 and 16 extend along the Z direction. The recessed portions 15 and 16 are, for example, V grooves or U grooves (a sectional shape of which is a V shape or a U shape) extending in the Z direction, and function as guide grooves when the ferrule 10 is inserted into and removed from the adapter 20. The recessed portions 15 and 16 may not be formed in the flange portion 12, or may extend to the flange portion 12. The ferrule 10 is made of a material such as polyphenylene sulfide (PPS), polyetherimide (PEI), polycarbonate (PC), polymethylmethacrylate (PMMA), polyethersulfone (PES), or cycloolefin polymer (COP), for example. The ferrule 10 is inserted into the adapter 20 along the Z direction, for example, and is fitted into the adapter 20.

The adapter 20 has a tubular shape capable of housing the ferrule 10 therein and is configured such that the ferrule 10 is inserted and fitted into the adapter 20 such that the ferrule 10 and another ferrule as a connection object face each other inside the tubular shape of the adapter 20. Inside the adapter 20, a front end surface 17 of the ferrule 10 and a front end surface of the another ferrule as a connection counterpart may butt against and come into contact with each other to achieve optical coupling, or may be separated from each other by a predetermined distance to achieve optical coupling. More specifically, the adapter 20 has an accommodation portion 22 that opens at a front end surface 21 and is configured such that the ferrule 10 is insertable into the accommodation portion 22. The accommodation portion 22 passes through the adapter 20 to a rear end surface on a side opposite to the front end surface 21 in the Z direction and is configured such that the another ferrule is inserted from an opening on the rear end surface.

The adapter 20 is provided with protruding portions 23 and 24 (a third protruding portion and a fourth protruding portion) facing each other in the Y direction on both inner side surfaces of the accommodation portion 22. The protruding portions 23 and 24 protrude toward the inside of the adapter 20, and when the ferrule 10 is inserted into the adapter 20, the protruding portions 23 and 24 enter and come into contact with the recessed portions 15 and 16 of the ferrule 10, and guide insertion of the ferrule 10 into the adapter 20 and its removal to the outside. The adapter 20 may further be provided with voids 25 and 26 outside the protruding portions 23 and 24. By providing the voids 25 and 26, the protruding portions 23 and 24 can be easily elastically moved outward in the Y direction. Therefore, even if the protruding portions 23 and 24 of the adapter 20 are formed to have a slightly narrow width so as to reliably come into contact with the recessed portions 15 and 16 of the ferrule 10, the protruding portions 23 and 24 can be moved outward when the adapter 20 is inserted.

The optical connection structure 1 includes the recessed portions 15 and 16 and the protruding portions 23 and 24. Accordingly, when the ferrule 10 is inserted into the adapter 20, the ferrule 10 (that is, the plurality of optical fibers 3 of the optical connector 2) can be positioned by restricting the position of the ferrule 10 with respect to the adapter 20 in the X direction and the Y direction and each rotation about each axis of the XYZ axes, even if a guide pin is not provided. Furthermore, in a case where the optical connector 2 includes an outer housing that is biased forward by an elastic member such as a spring and accommodates the optical connector 2 therein, the outer housing may restrict the movement of the ferrule 10 in the Z direction by the outer housing coming into contact with the adapter 20, by the spring, or the like, or the adapter 20 may have a configuration for restricting the movement of the ferrule 10 in the Z direction therein.

When the corresponding another optical connector is inserted from the opposite side into the adapter 20 positioned in this manner, the front end surface 17 of the ferrule 10 faces the front end surface of the ferrule (not illustrated) as a connection counterpart, and both are optically coupled. The adapter 20 is made of an elastic material having elasticity such as polyetherimide (PEI), polybutylene terephthalate (PBT), polyphenylene sulfide (PPS), polycarbonate (PC), polymethylmethacrylate (PMMA), polyethersulfone (PES), or polyamide (PA), for example. In order to reduce the difference between the linear expansion coefficient of the material of the adapter 20 and the linear expansion coefficient of the material of the ferrule 10, the same type of material as that of the ferrule 10 is preferably used as the material of the adapter 20. Furthermore, the material of the adapter 20 may contain a filler or an additive for improving slidability.

Figure 3:
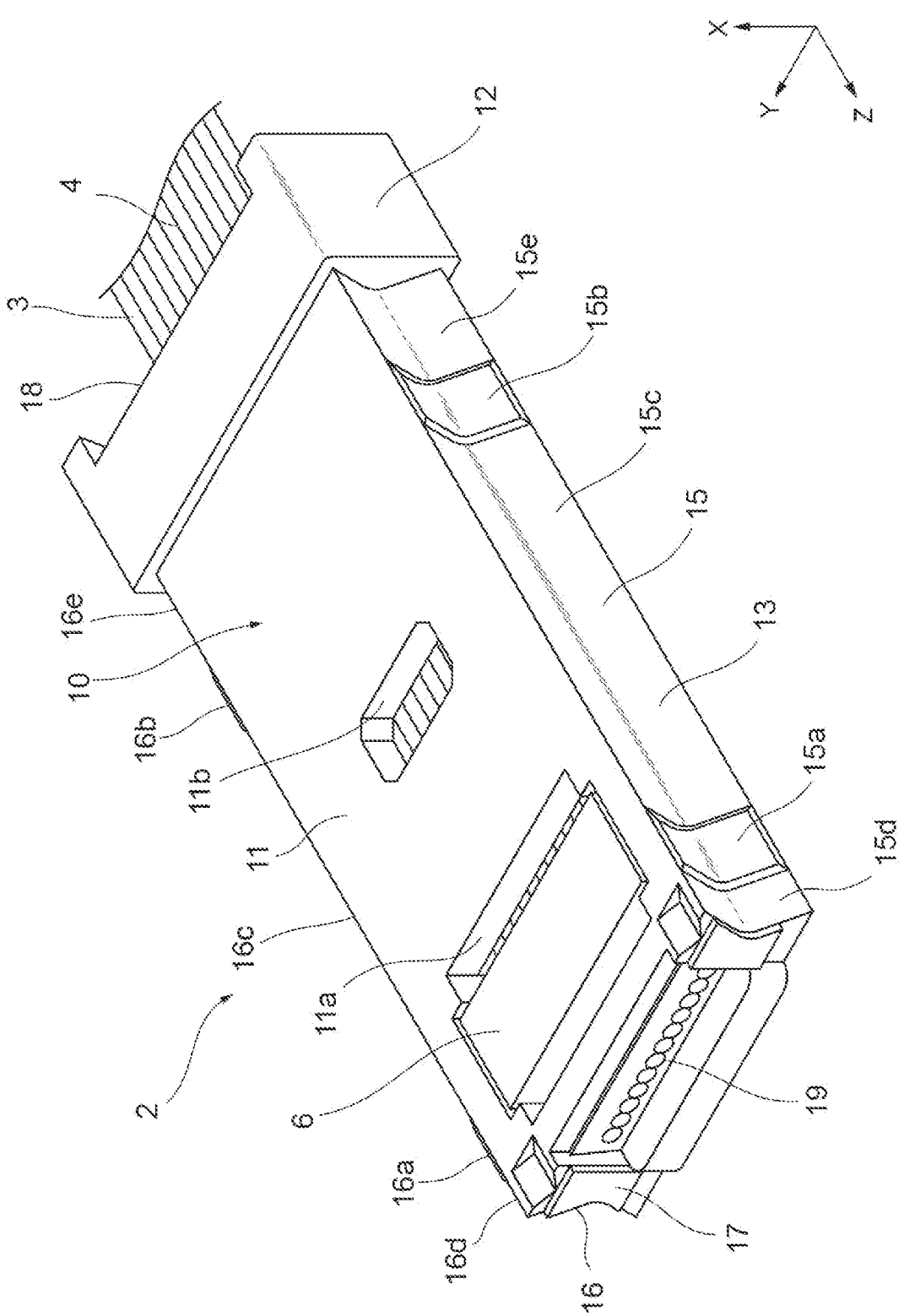
FIG. 3 is a perspective view illustrating the optical connector according to an embodiment.
Figure 4:
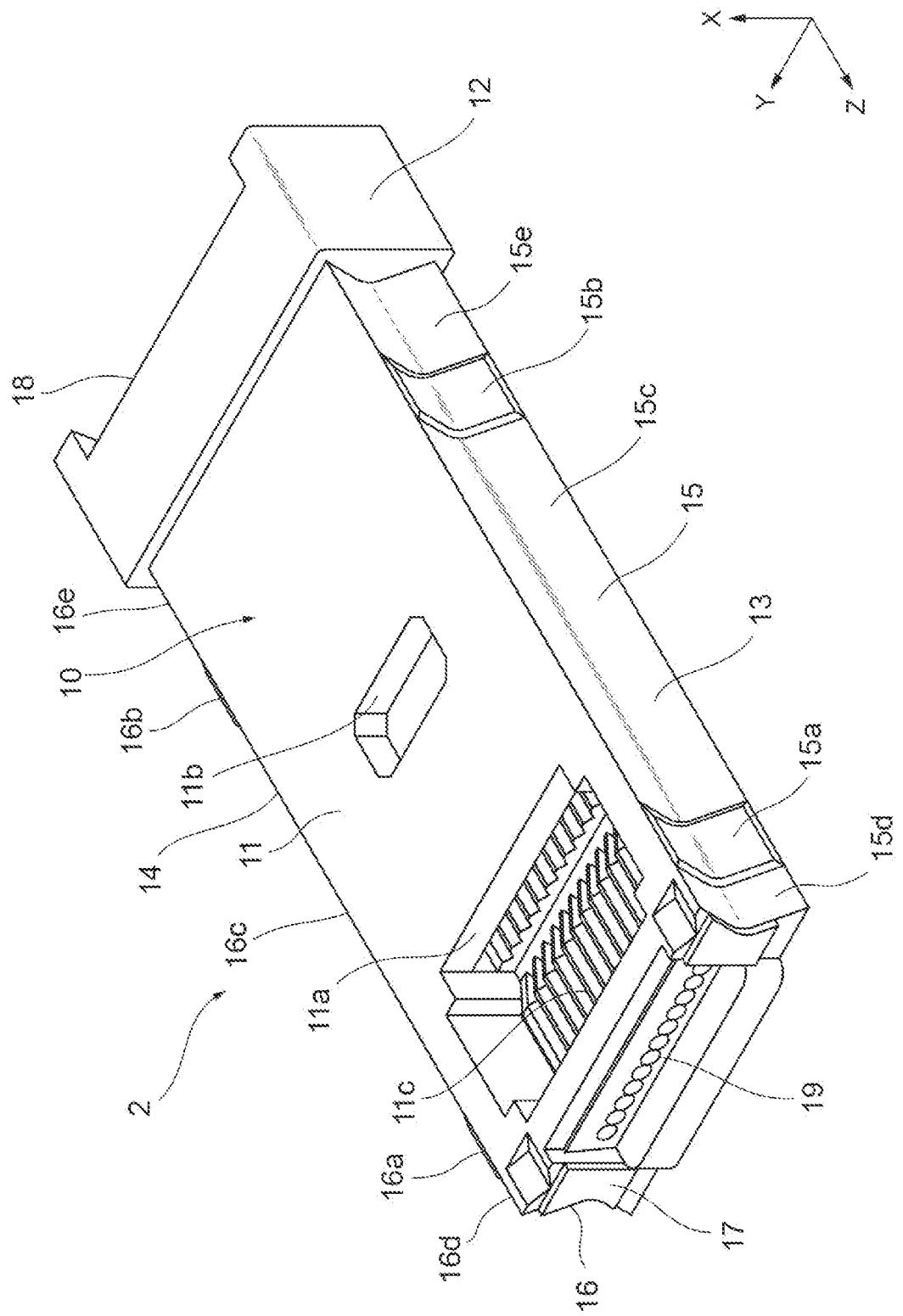
FIG. 4 is a perspective view illustrating a ferrule of the optical connector illustrated in FIG. 3.

Next, with reference to FIGS. 3 and 4, the shape of the ferrule 10 inserted into the adapter 20 will be described in more detail. FIG. 3 is a perspective view illustrating the optical connector 2 including the ferrule 10 according to an embodiment. FIG. 4 is a perspective view illustrating the ferrule 10. As described above, the ferrule 10 includes the main body portion 11, the flange portion 12, the side surfaces 13 and 14, the recessed portions 15 and 16, the front end surface 17, a rear end surface 18, and a lens group 19. The ferrule 10 is further provided with window portions 11a and 11b on an upper surface of the main body portion 11, and a plurality of groove portions 11c (optical fiber holding portion) for holding the plurality of optical fibers 3 are formed inside the window portion 11a. The plurality of groove portions 11c may be, for example, V grooves or U grooves, and extend along the Z direction. Furthermore, a plurality of through holes for holding the optical fibers may be provided inside the ferrule 10 instead of the plurality of groove portions 11c.

The plurality of optical fibers 3 constituting the optical connector 2 are inserted from the rear end surface 18 of the ferrule 10 into the accommodation portion continuing thereto, and arranged at a predetermined position with distal end portions thereof are accommodated in the plurality of groove portions 11c. The optical fibers 3 respectively aligned on and accommodated in the plurality of groove portions 11c are optically coupled to the respective lenses of the lens group 19 provided outside the ferrule 10 from the inside of the ferrule 10 (in this case, a portion of the ferrule 10 to the lens group 19 is made of at least a light transmissive resin, for example). After the optical fibers 3 are accommodated in the groove portions 11c, a lid portion 6 is fitted on the window portion 11a from above in the X direction, and presses the optical fibers 3 against the groove portions 11c to position the optical fibers 3. Furthermore, a fixing adhesive agent or the like is filled through the window portion 11a (a gap from the lid portion 6) or the window portion 11b to fix the optical fibers 3 to the plurality of groove portions 11c and the like.

The recessed portion 15 provided in the side surface 13 of the ferrule 10 includes two positioning portions 15a and 15b (a first positioning portion and a second positioning portion), a stepped portion 15c located between the positioning portions 15a and 15b, a stepped portion 15d located outside the positioning portion 15a, and a stepped portion 15e located between the positioning portion 15b and the flange portion 12. The stepped portions 15c, 15d, and 15e are each recessed inward of the ferrule 10 with respect to each surface of the positioning portions 15a and 15b. That is, the positioning portions 15a and 15b are formed to protrude slightly outward with respect to the stepped portions 15c, 15d, and 15e. In the ferrule 10, when the ferrule 10 is inserted into the adapter 20, these two positioning portions 15a and 15b come into contact with the protruding portion 23 of the adapter 20 (see FIG. 2), and the stepped portions 15c, 15d, and 15e do not come into contact with (or slightly touch) the protruding portion 23 of the adapter 20. As for the recessed amount of the stepped portions 15c, 15d, and 15e, for example, the difference between each surface of the positioning portions 15a and 15b and a bottom surface of each of the stepped portions 15c, 15d, and 15e may be 0.005 mm or more and 2 mm or less. The stepped portions 15c, 15d, and 15e are slight steps that do not hinder the contact between the positioning portions 15a and 15b and the protruding portion 23 of the adapter 20 in the Y direction. However, the difference between each surface of the positioning portions 15a and 15b and the bottom surface of each of the stepped portions 15c, 15d, and 15e may be larger than 2 mm.

The positioning portions 15a and 15b are separated from each other in a Z-axis direction, and the separation distance may be, for example, 1 mm or more and 10 mm or less. The separation distance here is the shortest separation distance between both the positioning portions, and for example, a distance between an end of the positioning portion 15a closer to the positioning portion 15b and an end of the positioning portion 15b closer to the positioning portion 15a. Furthermore, the positioning portion 15a is formed inward such that an end thereof is separated from the adjacent front end surface 17 of the ferrule 10 in the Z-axis direction by at least 0.1 mm or more. The term "inward" here means that the positioning portion 15a is located on a flange portion 12 side with respect to the front end surface 17 along the Z-axis direction. Furthermore, the positioning portion 15b is formed inward such that an end thereof is separated from the adjacent flange portion 12 of the ferrule 10 in the Z-axis direction by at least 0.1 mm or more. The term "inward" here means that the positioning portion 15b is located on a front end surface 17 side with respect to the flange portion 12 along the Z-axis direction. With the above configuration, the stepped portion 15d is formed between the positioning portion 15a and the front end surface 17, and the stepped portion 15e is formed between the positioning portion 15b and the flange portion 12. Furthermore, the positioning portions 15a and 15b may each have a width of 0.5 mm or more and 3 mm or less along the Z-axis direction. With such a certain width, when the ferrule 10 is inserted into the adapter 20, contact regions with the adapter 20 can be secured, and the positioning portions 15a and 15b can function as portions for more appropriately positioning the ferrule 10 (or the plurality of optical fibers 3 held therein) with respect to the adapter 20.

Furthermore, similarly to the recessed portion 15, the recessed portion 16 provided in the side surface 14 of the ferrule 10 includes two positioning portions 16a and 16b (a third positioning portion and a fourth positioning portion), a stepped portion 16c located between the positioning portions 16a and 16b, a stepped portion 16d located outside the positioning portion 16a, and a stepped portion 16e located between the positioning portion 16b and the flange portion 12. The recessed portion 16 has a shape line symmetrical to the recessed portion 15 about a center axis passing through the center of the ferrule 10 in the Y direction and extending in the Z-axis direction, the positioning portions 16a and 16b have a shape line symmetrical to the positioning portions 15a and 15b, the stepped portions 16c, 16d, and 16e have a shape line symmetrical (that is, a shape bilaterally symmetrical) to the stepped portions 15c, 15d, and 15e. Therefore, the positioning portions 16a and 16b are provided on the side surface 14 so as to be at the positions same as those of the positioning portions 15a and 15b on the side surface 13 in the Z direction. Furthermore, the stepped portions 16c, 16d, and 16e are each recessed inward of the ferrule 10 with respect to each surface of the positioning portions 16a and 16b. That is, the positioning portions 16a and 16b are formed to protrude slightly outward with respect to the stepped portions 16c, 16d, and 16e. Other configurations of the positioning portions 16a and 16b and the stepped portions 16c, 16d, and 16e are similar to those of the positioning portions 15a and 15b and the stepped portions 15c, 15d, and 15e described above, and a detailed description thereof will be omitted.

In a case where the cross-sectional shape of the positioning portions 15a, 15b, 16a, and 16b of the recessed portions 15 and 16 is a V shape, an opening angle of the V shape (that is, an angle formed by a pair of surfaces constituting the V groove) may be, for example, 45° or more and 150° or less in a cross section perpendicular to the Z direction. The opening angle of the V groove of the positioning portions 15a, 15b, 16a, and 16b may be, for example, 60° or more and 100° or less, or may be 90°. Furthermore, a bottom portion of the V groove constituting each of the positioning portions 15a, 15b, 16a, and 16b may be, for example, rounded in a cross section perpendicular to the Z direction. Note that the distance between the bottom portions of the positioning portions 15a and 15b of the recessed portion 15 and the bottom portions of the positioning portions 16a and 16b of the recessed portion 16, which are facing each other along the Y direction, is formed to be slightly greater than the distance between distal ends of the protruding portions 23 and 24 of the adapter 20. As a result, when the ferrule 10 is inserted into the adapter 20, the ferrule 10 is positioned at a predetermined position with respect to the adapter 20 by the positioning portions 15a and 15b of the recessed portion 15 and the positioning portions 16a and 16b of the recessed portion 16.

In this manner, the ferrule 10 according to the present embodiment is positioned with respect to the adapter 20 or another ferrule by the positioning portions 15a, 15b, 16a, and 16b of both the side surfaces 13 and 14. Accordingly, the ferrule 10 is not provided with a guide pin insertion hole between each of the side surfaces 13 and 14 and the lens group 19 on the front end surface 17. Therefore, the arrangement position of the lens group 19 on the front end surface 17 can be set without considering the outer diameter of the guide pin insertion hole. In this case, the guide pin insertion hole is not provided, so that the size of the ferrule 10 can be reduced accordingly. Note that, instead of the lens group 19, through holes corresponding to the respective optical fibers 3 may be provided so that the distal ends of the optical fibers 3 can be inserted thereinto and exposed to the front end surface 17.

As described above, the ferrule 10 according to the present embodiment is provided with the recessed portion 15 in the side surface 13 and the recessed portion 16 in the side surface 14. When the ferrule 10 is inserted into the adapter 20 having an inner surface (protruding portions 23 and 24) corresponding to this shape, the recessed portion 15 and the recessed portion 16 are caused to be fitted on the inner surface of the adapter 20, so that the position of the ferrule 10 (that is, the positions of the plurality of optical fibers 3 held in the ferrule 10) with respect to the adapter 20 can be defined in a plane perpendicular to the Z direction. That is, according to this ferrule configuration, by using the adapter 20 into which the ferrule 10 is inserted and fitted as a positioning member when the plurality of optical fibers 3 are positioned, the plurality of optical fibers 3 can be positioned without providing a guide pin insertion hole in the ferrule 10. As a result, it is not necessary to use a guide pin having high dimensional accuracy for positioning the plurality of optical fibers 3 with each other. Furthermore, it is possible to avoid a situation in which the positioning accuracy between the plurality of optical fibers 3 decreases due to the use of the guide pin to which foreign matter adheres, so that a decrease in connection loss can be suppressed.

Furthermore, more specifically, in this ferrule 10, the side surface 13 is provided with two positioning portions 15a and 15b that come into contact with the inner surface of the adapter to position the ferrule 10 with respect to the adapter so as to be separated from each other on the side surface 13, and one side of the ferrule 10 is positioned by these portions. Furthermore, the side surface 14 is provided with two positioning portions 16a and 16b that come into contact with the inner surface of the adapter to position the ferrule 10 with respect to the adapter so as to be separated from each other on the side surface 14, and the other side of the ferrule 10 is positioned by these portions. According to this configuration, not the entire side surfaces 13 and 14 but limited portions such as the positioning portions 15a and 15b, and 16a and 16b are brought into contact with the inner surface of the adapter to perform positioning. Therefore, it is sufficient that only these positioning portions are formed with high dimensional accuracy, and the optical fibers 3 held in the ferrule 10 can be positioned with high accuracy without forming the entire side surfaces 13 and 14 with high dimensional accuracy. That is, in this ferrule 10, by forming at least two portions separated from each other such as the positioning portions 15a and 15b, and 16a and 16b with high dimensional accuracy, it is possible to easily manage the inclination, positional displacement, or the like of the ferrule 10 at the time of fitting the ferrule 10 into the adapter 20. Note that the ferrule for the optical connector may be manufactured by, for example, injection molding or the like, and in some cases, the ferrule may be partially contracted after molding. Accordingly, in some cases, it may be difficult to manufacture the entire side surface having the continuous V groove or the like with high dimensional accuracy. However, as described above, a portion where the dimensional accuracy is enhanced is limited by forming parts of the side surfaces 13 and 14 as the positioning portions 15a, 15b, 16a, and 16b that come into contact with the inner surface of the adapter. As a result, even in a case where the ferrule is manufactured by injection molding or the like, it is possible to easily manufacture the ferrule 10 that can be highly accurately positioned with respect to the adapter 20. Note that the ferrule 10 may of course be manufactured by other than injection molding. As described above, according to the ferrule 10, the plurality of optical fibers 3 can be easily positioned with a simple configuration.

In the present embodiment, the recessed portions 15 and 16 further include the stepped portions 15c and 16c located between the respective positioning portions and extending along the Z direction, and the stepped portions 15c and 16c are recessed inward of the ferrule 10 with respect to the surface of each of the positioning portions 15a, 16a and the like. As a result, the positioning portions 15a and 15b, 16a and 16b are each reliably brought into contact with the inner surface of the adapter 20, and the ferrule 10 can be easily positioned. Furthermore, even if the stepped portions 15c and 16c do not have high dimensional accuracy, it is possible to eliminate the influence on positioning by the positioning portions 15a and 15b, and 16a and 16b.

In the present embodiment, the positioning portions 15a and 15b may be separated from each other in the Z direction by a distance of 1 mm or more and 10 mm or less. In this case, the positioning portion 15a and the positioning portion 15b are located to be separated from each other by 1 mm or more and come into contact with the inner surface of the adapter in this state. Accordingly, the ferrule 10 can be more accurately positioned with respect to the adapter 20 as compared with a case where both the positioning portions 15a and 15b are close to each other (a case where the positioning portions 15a and 15b are closer than 1 mm) Furthermore, by setting the separation distance between the positioning portion 15a and the positioning portion 15b to 10 mm or less, it is possible to make the ferrule 10 compact without increasing the size. Note that the configuration of the separation distance between the positioning portions 16a and 16b is similarly set.

In the present embodiment, the positioning portions 15a and 15b may be formed inward so as to be separated from the adjacent front end surface 17 of the ferrule 10 or the adjacent flange portion 12 of the ferrule 10 in the Z direction by at least 0.1 mm or more. In this case, when the ferrule 10 is inserted into or removed from the adapter 20, it is possible to prevent the positioning portion 15a or the positioning portion 15b from hindering such an operation, and to perform a smooth insertion and removal operation. Note that the arrangement positions of the positioning portions 16a and 16b are similarly set.

In the present embodiment, the positioning portions 15a and 15b, and 16a and 16b may each have a width of 0.5 mm or more and 3 mm or less along the Z direction. In this case, when the ferrule 10 is inserted into the adapter 20, each positioning portion can be more reliably brought into contact with the inner surface of the adapter, so that the ferrule can be more accurately positioned with respect to the adapter by each positioning portion.

In the present embodiment, the positioning portions 15a, 15b, 16a, and 16b may each have a V shape or a U shape in a cross section perpendicular to the Z direction. In this case, the shape of each positioning portion can be made simple, and furthermore, the dimensional accuracy of each positioning portion can be easily enhanced because of the simple configuration.

In the present embodiment, the arrangement positions of the positioning portions 16a and 16b on the recessed portion 16 in the Z direction correspond to the arrangement positions of the positioning portions 15a and 15b on the recessed portion 15 in the Z direction. That is, a shape of the side surface of the recessed portion 16 and a shape of the side surface of the recessed portion 15 are line symmetric about the center axis of the ferrule 10. Therefore, when the ferrule 10 is inserted into the adapter 20 and positioned, the ferrule 10 can be more accurately positioned by improving the balance between the left and right.

In the present embodiment, the ferrule 10 further has the front end surface 17 and the rear end surface 18 facing each other in the Z direction. The front end surface 17 is provided with a plurality of lenses of the lens group 19 or a plurality of through holes corresponding to the plurality of optical fibers 3, and the rear end surface 18 is provided with an opening into which the plurality of optical fibers 3 are collectively insertable. Then, in the ferrule 10, the front end surface 17 is not provided with a positioning pin hole for positioning the ferrule 10 with respect to another ferrule as a connection object. Therefore, the ferrule 10 can be positioned with respect to the adapter 20 with a simpler configuration.

Figure 5:
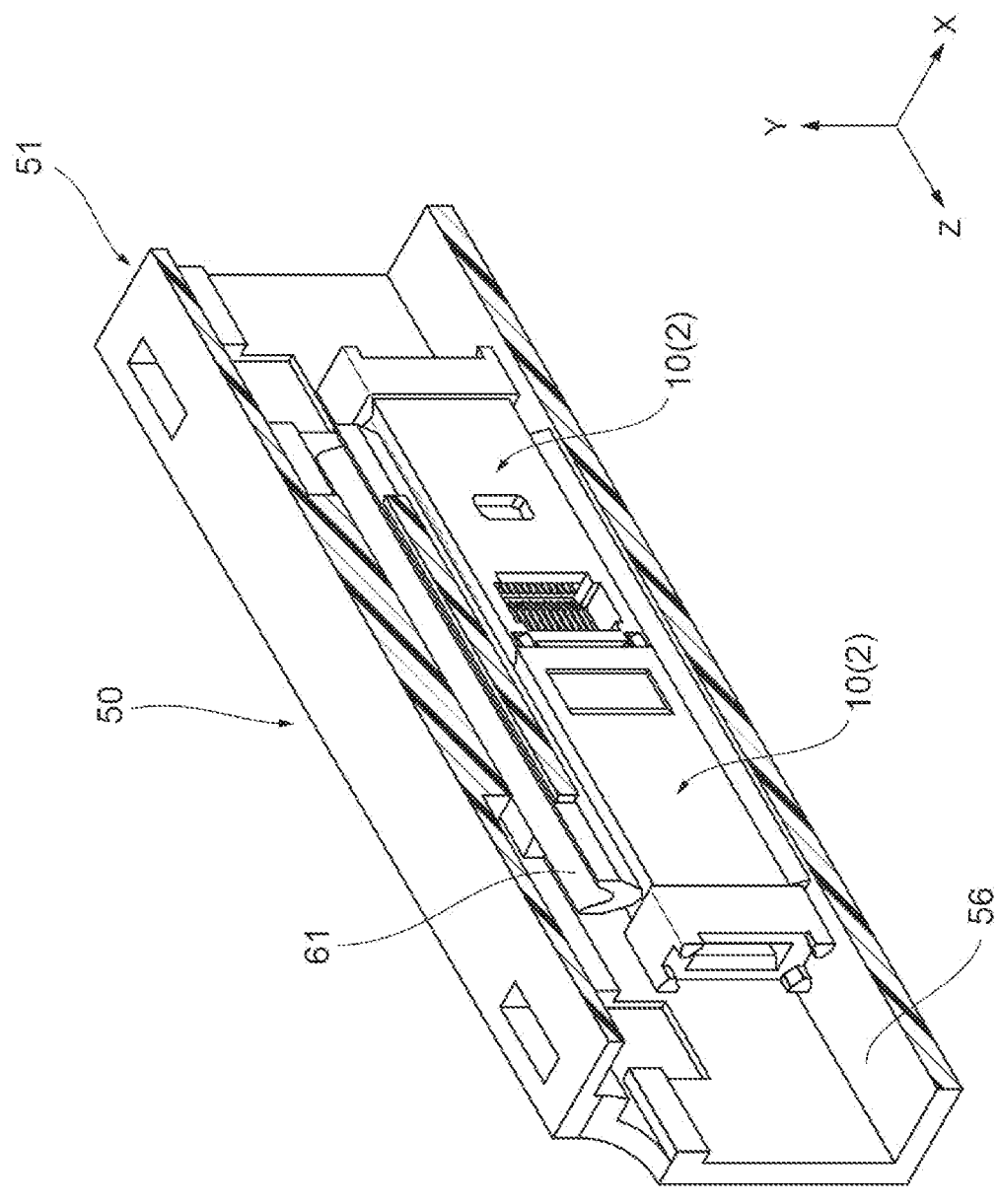
FIG. 5 is a perspective view illustrating a state in which the ferrule (optical connector) illustrated in FIG. 4 is connected to another ferrule (optical connector) in an adapter according to a modification.
Figure 6:
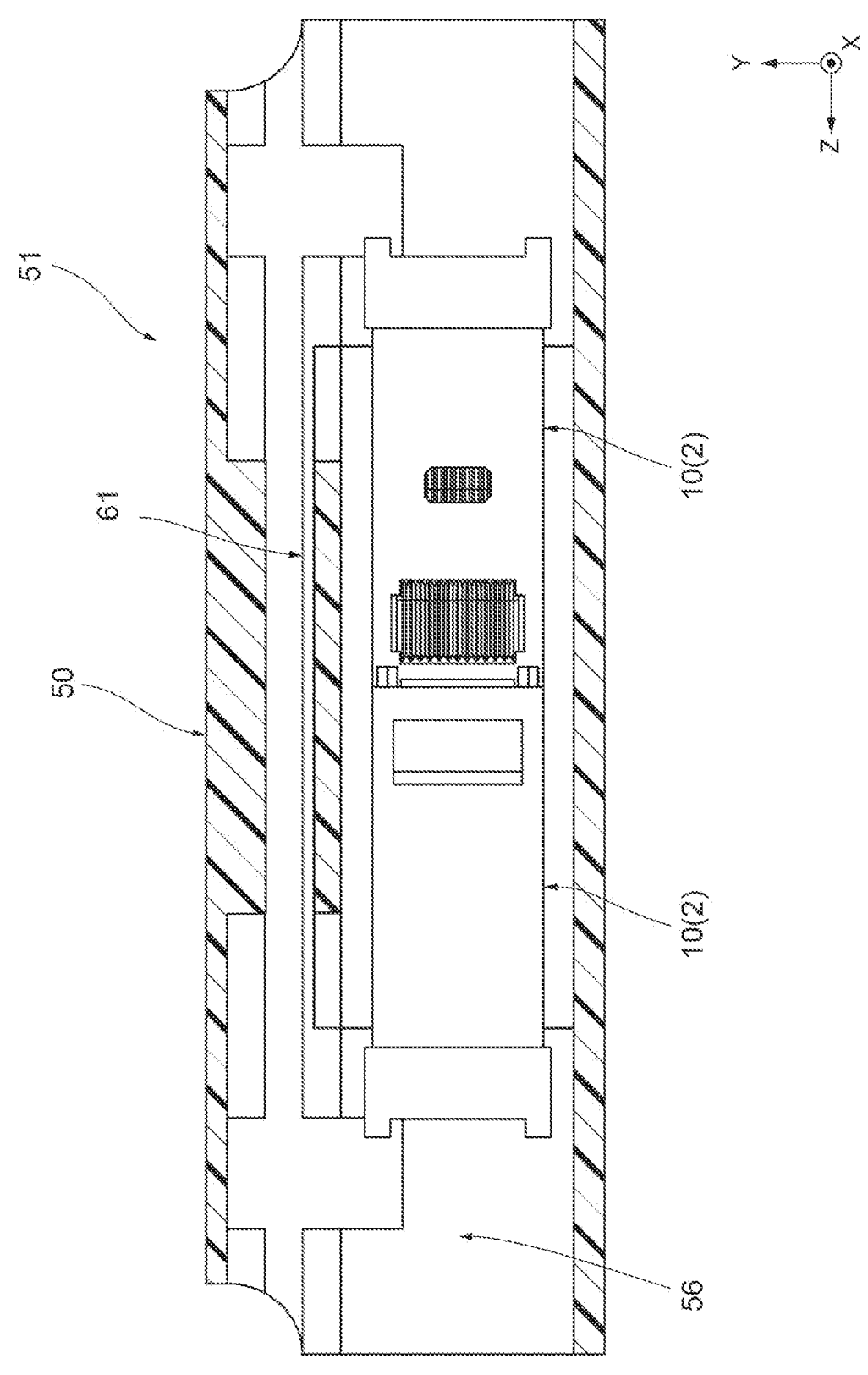
FIG. 6 is a view of a connection state illustrated in FIG. 5 as viewed from a side surface side.
Figure 7:
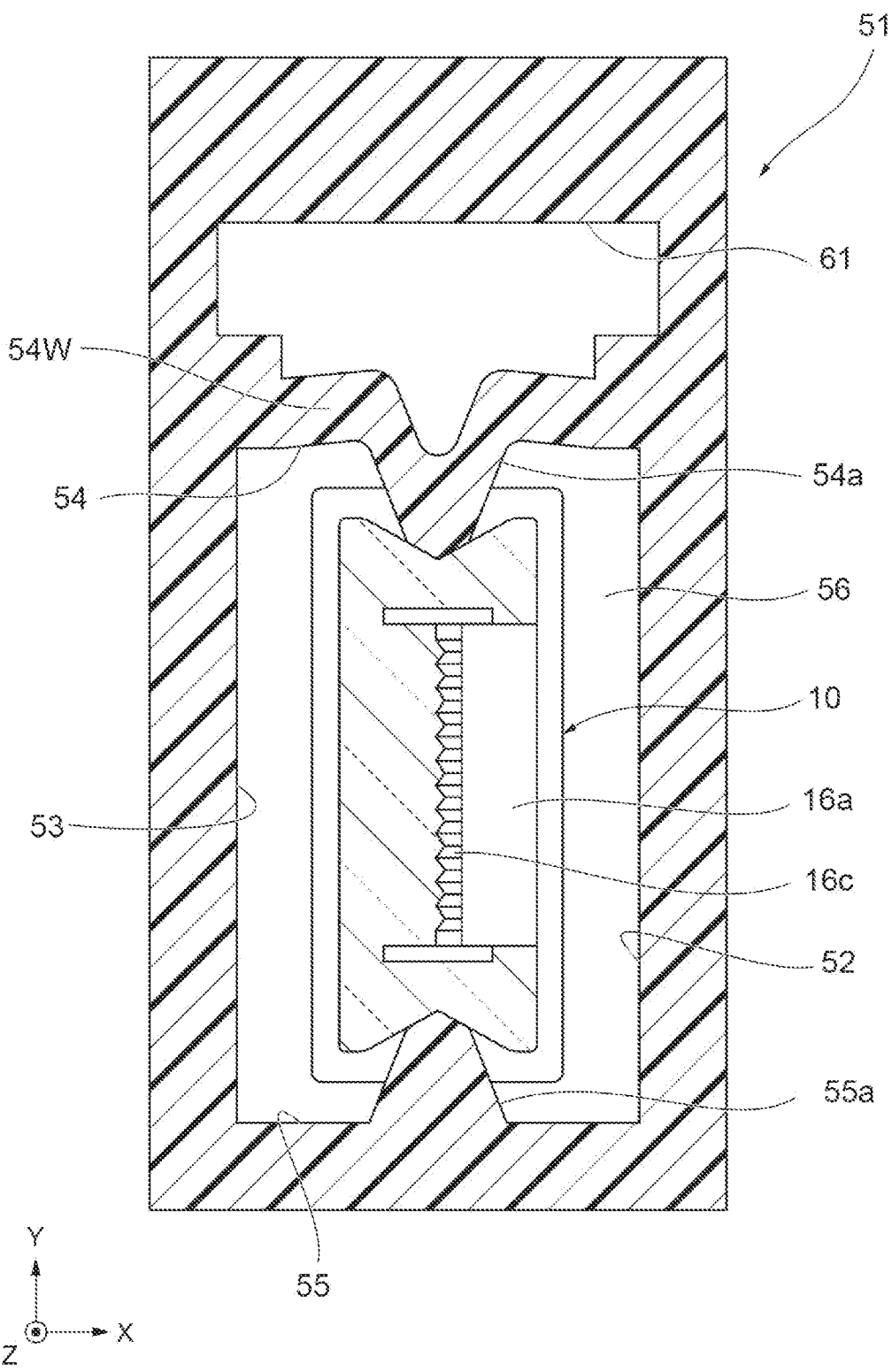
FIG. 7 is a cross-sectional view of the connection state illustrated in FIG. 5.

The present disclosure is not limited to the embodiment described above, and can be appropriately modified without departing from the gist described in the claims For example, with reference to FIGS. 5, 6, and 7, a modification of the optical connection structure including the optical connector 2 including the ferrule 10 described above will be described. In this modification, an adapter 50 is different from the adapter 20 according to the above embodiment. FIG. 5 is a perspective view illustrating an optical connection structure 51. FIG. 6 is a plan view illustrating the optical connection structure 51. FIG. 7 is a cross-sectional view illustrating the optical connection structure 51. Note that optical connectors illustrated in FIGS. 5, 6, and 7 are illustrated in a state in which the plurality of optical fibers 3 and the like are omitted (that is, in a state in which only the ferrule 10 is illustrated).

Furthermore, in FIGS. 5 and 6, the adapter 50 of the optical connection structure 51 is illustrated as a cut cross section taken along a YZ plane.

As illustrated in FIGS. 5 and 6, the optical connection structure 51 includes a pair of optical connectors 2 and 2 arranged to face each other in the Z direction, and the adapter 50 into which the pair of optical connectors 2 and 2 are inserted. The pair of optical connectors 2 and 2 are arranged in a state in which the upper and lower sides (directions facing each other in the X direction) of the pair of optical connectors 2 and 2 are reversed, and are fitted into the adapter 50 such that the front end surfaces 17 and 17 (for example, see FIG. 4) of the respective ferrules 10 and 10 face each other inside the adapter 50. Inside the adapter 50, the front end surfaces 17 and 17 of the pair of ferrules 10 and 10 may butt against and come into contact with each other, or may face each other at a predetermined distance separated from each other.

The adapter 50 has a tubular shape capable of housing the pair of ferrules 10 and 10, and extends along the Z direction. The total length of the adapter 50 in the Z direction is, for example, longer than a length obtained by summing up the total lengths of the pair of ferrules 10 and 10 in a state of being connected to each other. As illustrated in FIG. 7, the adapter 50 has a rectangular tubular shape as viewed in the Z direction. The adapter 50 has an insertion hole 56 constituting a rectangular tubular interior. The insertion hole 56 passes through the adapter 50 in the Z direction. The insertion hole 56 has a substantially rectangular shape as viewed in the Z direction, and has four inner surfaces 52, 53, 54, and 55.

The inner surface 52 faces an outer side surface (upper surface) of the ferrule 10 in the X direction, and the inner surface 53 faces an outer side surface (lower surface) of the ferrule 10 in the X direction. The inner surface 54 faces the side surface 13 of the ferrule 10 in the Y direction, and the inner surface 55 faces the side surface 14 of the ferrule 10 in the Y direction. The inner surface 54 and the inner surface 55 are respectively provided with a V protrusion 54a and a V protrusion 55a for guiding the positioning portions 15a and 15b of the recessed portion 15 and the positioning portions 16a and 16b of the recessed portion 16 of the ferrule 10. The V protrusion 54a and the V protrusion 55a are arranged at positions symmetrical to each other with respect to the center of the insertion hole 56 in the Y direction. The V protrusion 54a is a protrusion having a V shape in an XY cross section. The V protrusion 54a protrudes from the inner surface 54 toward the side surface 13 of the ferrule 10, and abuts on the positioning portions 15a and 15b of the recessed portion 15 of the side surface 13. The V protrusion 54a is provided on the inner surface 54 so as to extend continuously along the Z direction, for example. The V protrusion 55a is a protrusion having a V shape in the XY cross section. The V protrusion 55a protrudes from the inner surface 55 toward the side surface 14 of the ferrule 10, and abuts on the positioning portions 16a and 16b of the recessed portion 16. The V protrusion 55a is provided on the inner surface 55 so as to extend continuously along the Z direction, for example.

The V protrusion 54a has a shape corresponding to the positioning portions 15a and 15b of the recessed portion 15, and the opening angle of the V protrusion 54a (that is, an angle formed by a pair of outer surfaces constituting the V protrusion 54a) is set to be smaller than the opening angle of the positioning portions 15a and 15b of the recessed portion 15 of the ferrule 10. Furthermore, a top portion of the V protrusion 54a is, for example, rounded and has a substantially circular shape. The V protrusion 55a has a shape corresponding to the positioning portions 16a and 16b of the recessed portion 16, and has the same shape as the V protrusion 54a (for example, the roundness of the top portion or the like). The separation distance between the V protrusion 54a and the V protrusion 55a in the Y direction is set to be slightly smaller than a width between the positioning portion 15a (15b) of the recessed portion 15 and the positioning portion 16a (16b) of the recessed portion 16 of the ferrule 10 in the Y direction. The separation distance between the V protrusion 54a and the V protrusion 55a in the Y direction can be defined as a distance between the top portion of the V protrusion 54a and the top portion of the V protrusion 55a in the Y direction in a state in which the ferrule 10 is not inserted into the adapter 50. The width between the positioning portion 15a (15b) of the recessed portion 15 and the positioning portion 16a (16b) of the recessed portion 16 in the Y direction can be defined as a distance between the bottom portion of the positioning portion 15a (15b) of the recessed portion 15 and the bottom portion of the positioning portion 16a (16b) of the recessed portion 16 in the Y direction. In the optical connection structure 51, in a case where the ferrule 10 is inserted into the adapter 50, the positioning portions 15a and 15b of the recessed portion 15 of the ferrule 10 circumscribe the virtual circle of the rounded portion of the distal end of the V protrusion 54a, and the positioning portions 16a and 16b of the recessed portion 16 of the ferrule 10 circumscribe the virtual circle of the rounded portion of the distal end of the V protrusion 55a. With such a connection structure, the ferrule 10 is appropriately positioned with respect to the adapter 50.

The adapter 50 further has a hollow 61 provided on one outer side of the insertion hole 56 in the Y direction. The hollow 61 is located outside the insertion hole 56 with a wall portion 54W constituting the inner surface 54 interposed therebetween in the Y direction. That is, the hollow 61 is separated from the insertion hole 56 via the wall portion 54W in the Y direction. The hollow 61 linearly extends along the Z direction at a position aligned with the insertion hole 56 in the Y direction, for example. The wall portion 54W extends in the X direction between the hollow 61 and the insertion hole 56 so as to separate the hollow 61 and the insertion hole 56. A thickness of the wall portion 54W (that is, a width of the wall portion 54W in the Y direction) is, for example, constant. The thickness of the wall portion 54W is a thickness sufficiently thin to allow elastic deformation of the V protrusion 54a. Similarly, a thickness of the wall portion constituting the inner surface 55 is a thickness sufficiently thin to allow elastic deformation of the V protrusion 55a. Note that no hollow is provided on the other outer side of the insertion hole 56 in the Y direction.

In the optical connection structure 51 described above, when the ferrule 10 is inserted into the adapter 50, the positioning portions 15a and 15b of the recessed portion 15 and the positioning portions 16a and 16b of the recessed portion 16 of the ferrule 10 are respectively caused to be fitted with the V protrusion 54a and the V protrusion 55a of the adapter 50. At this time, the V protrusion 54a enters and abuts on the positioning portions 15a and 15b of the recessed portion 15 of the ferrule 10, and the V protrusion 55a enters and abuts on the positioning portions 16a and 16b of the recessed portion 16 of the ferrule 10. Here, as described above, the separation distance between the V protrusion 54a and the V protrusion 55a of the adapter 50 is set to be smaller than the width between the positioning portion 15a (15b) of the recessed portion 15 and the positioning portion 16a (16b) of the recessed portion 16 of the ferrule 10. Accordingly, the V protrusion 54a and the V protrusion 55a of the adapter 50 receive a reaction force from the positioning portions 15a and 15b of the recessed portion 15 and the positioning portions 16a and 16b of the recessed portion 16 of the ferrule 10, and are elastically deformed to the outside of the ferrule 10 in the Y direction. Then, a force of the V protrusion 54a and the V protrusion 55a of the adapter 50 trying to return to the original position is applied to the ferrule 10, and the ferrule 10 is brought into a state of being sandwiched and fixed by the V protrusion 54a and the V protrusion 55a of the adapter 50.

As a result, the V protrusion 54a and the V protrusion 55a of the adapter 50 respectively come into contact with the positioning portions 15a and 15b of the recessed portion 15 and the positioning portions 16a and 16b of the recessed portion 16 of the ferrule 10, and the gap between the V protrusion 54a and the positioning portions 15a and 15b of the recessed portion 15 in the Y direction and the gap between the V protrusion 55a and the positioning portions 16a and 16b of the recessed portion 16 in the Y direction each become zero. As a result, the position of the ferrule 10 with respect to the adapter 50 is defined in the XY plane, and the position of the ferrule 10 in the rotation direction with respect to the adapter 50 is defined. Thereafter, a spring (not illustrated) attached to the rear of the ferrule 10 biases the ferrule 10 toward the side of the ferrule 10 as the connection counterpart in the Z direction, whereby the position of the ferrule 10 in the Z direction with respect to the adapter 50 is defined. In this manner, the position of the ferrule 10 with respect to the adapter 50 is defined.

In this modification, the V protrusion 54a and the V protrusion 55a are portions constituting parts of the adapter 50 made of an elastic material. Accordingly, both the V protrusion 54a and the V protrusion 55a are configured to be elastically deformable. However, for example, only the V protrusion 54a may be configured to be elastically deformable, and the V protrusion 55a may not be configured to be elastically deformable. In this modification, the hollow 61 is provided outside the wall portion 54W where the V protrusion 54a is provided. Accordingly, if a portion near the wall portion 54W is made of an elastic material, only the V protrusion 54a can be configured to be elastically deformable. In this case, when the ferrule 10 is inserted into the adapter 50, the positioning portions 16a and 16b of the recessed portion 16 of the ferrule 10 are arranged to butt against the V protrusion 55a that does not elastically deform, and the positioning portions 15a and 15b of the recessed portion 15 of the ferrule 10 are made to abut on the V protrusion 54a that elastically deforms. At this time, the V protrusion 54a receives a reaction force from the positioning portions 15a and 15b of the recessed portion 15 and is elastically deformed, and a force of the V protrusion 54a trying to return to the original position is applied to the ferrule 10. As a result, the ferrule 10 is brought into a state of being sandwiched and fixed by the V protrusion 54a and the V protrusion 55a, and the position of the ferrule 10 with respect to the adapter 50 is defined. Even with such an adapter configuration, the ferrule 10 described above can be positioned with respect to the adapter 50 with a simple configuration.

Figure 8:
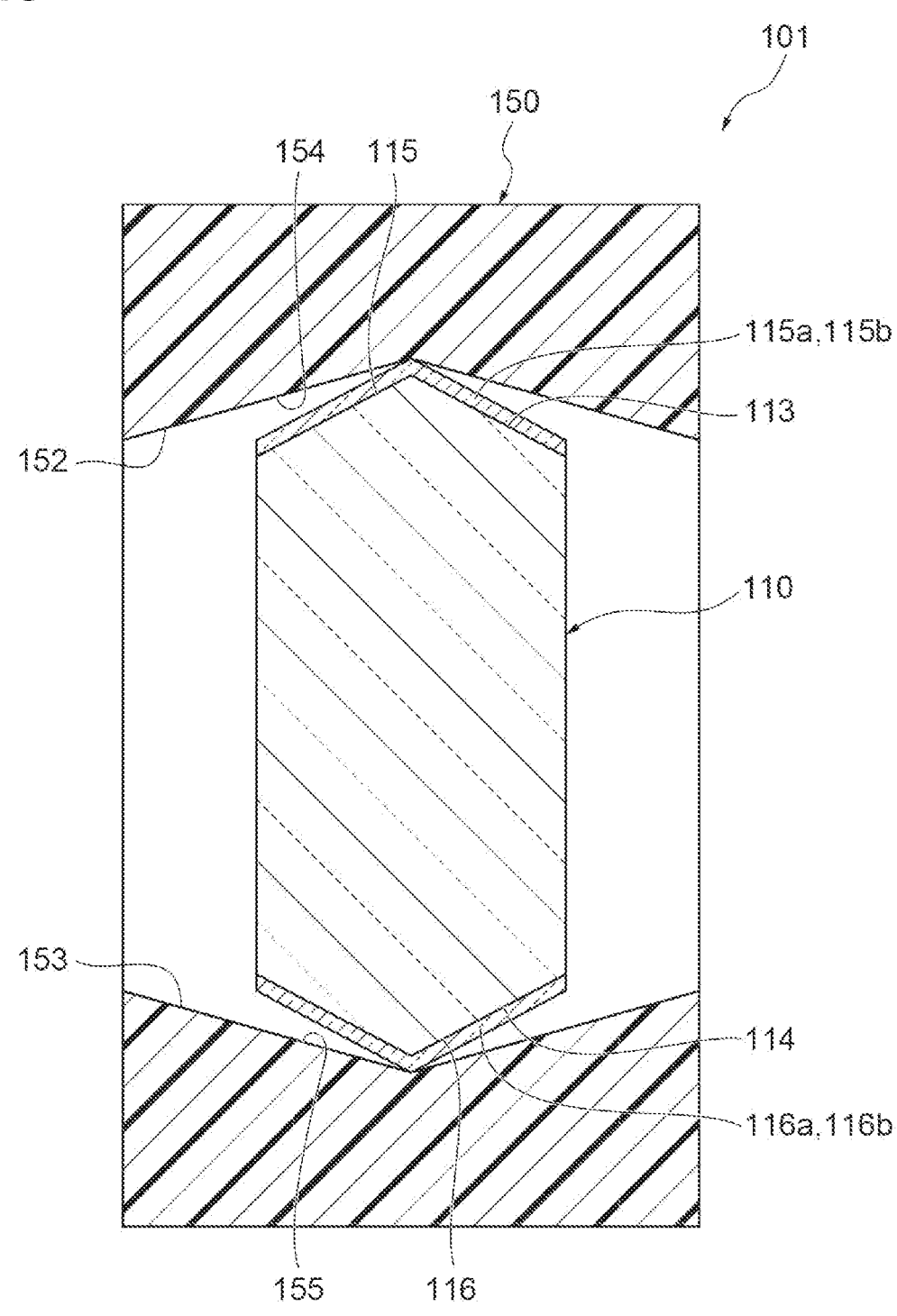
FIG. 8 is a cross-sectional view of an optical connection structure according to a modification.
Figure 9:
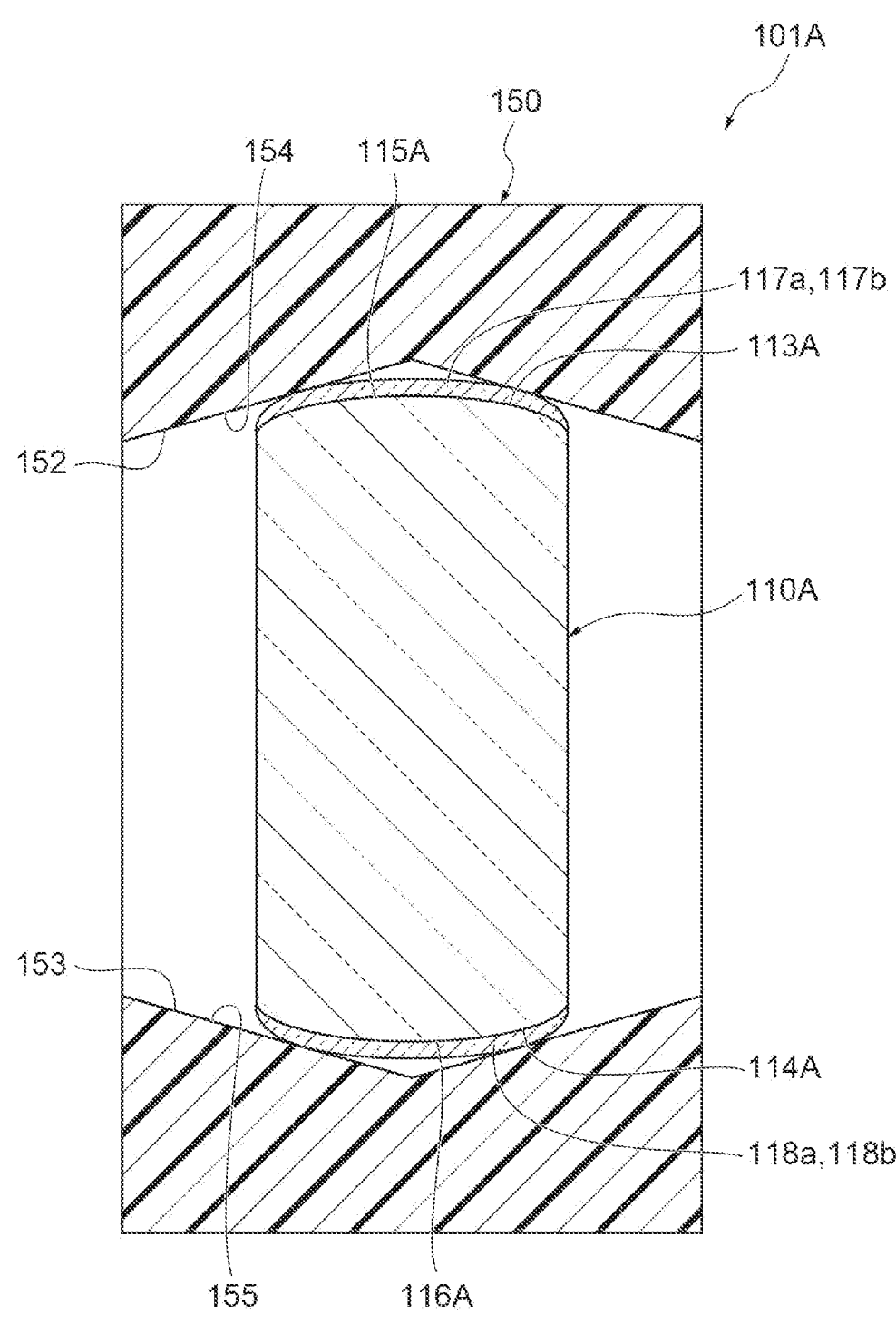
FIG. 9 is a cross-sectional view of an optical connection structure according to another modification.

Furthermore, in the embodiment and the modification described above, the recessed portions 15 and 16 (grooves) are formed in the side surfaces 13 and 14 of the ferrule 10, the protruding portions 23 and 24 or the V protrusions 54a and 55a are formed on the inner surface of the adapter 20 or 50, and the protruding portions 23 and 24 or the V protrusions 54a and 55a enter the recessed portions 15 and 16, so that the ferrule 10 is positioned with respect to the adapter 20 or 50. Conversely, however, as illustrated in FIG. 8, in an optical connection structure 101, protruding portions 115 and 116 (a first protruding portion and a second protruding portion) may be formed on side surfaces 113 and 114 of a ferrule 110, recessed portions 154 and 155 (a third recessed portion and a fourth recessed portion) may be provided in inner surfaces 152 and 153 of an adapter 150, and the ferrule 110 may be inserted into the adapter 150. A basic configuration of the ferrule 110 excluding the shapes of the side surfaces is similar to the ferrule 10, and a detailed description thereof is omitted in FIG. 8. In this modification, two positioning portions 115a and 115b may be provided on the protruding portion 115 formed on the side surface 113 of the ferrule 110, and two positioning portions 116a and 116b may be provided on the protruding portion 116 formed on the side surface 114 of the ferrule 110. The two positioning portions 115a and 115b and the two positioning portions 116a and 116b are, similarly to the positioning portions 15a and 15b and the positioning portions 16a and 16b of the ferrule 10, formed to be separated from each other in the longitudinal direction (Z direction, a direction orthogonal to the paper surface of FIG. 8), and formed to protrude slightly outward with respect to other portions (stepped portions) of the side surface 113 and the side surface 114. Note that, as illustrated in FIG. 9, in an optical connection structure 101A, protruding portions 115A and 116A of side surfaces 113A and 114A of a ferrule 110A may have a semicircular protrusion shape or an elliptical protrusion shape, and two positioning portions 117a and 117b may be provided on the side surface 113A having such a shape, and two positioning portions 118a and 118b may be provided on the side surface 114A. Similarly to the above, the two positioning portions 117a and 117b and the two positioning portions 118a and 118b are, similarly to the positioning portions 15a and 15b and the positioning portions 16a and 16b of the ferrule 10, formed to be separated from each other in the longitudinal direction (Z direction, a direction orthogonal to the paper surface of FIG. 9), and formed to protrude slightly outward with respect to other portions (stepped portions) of the side surface 113A and the side surface 114A.

Figure 10:
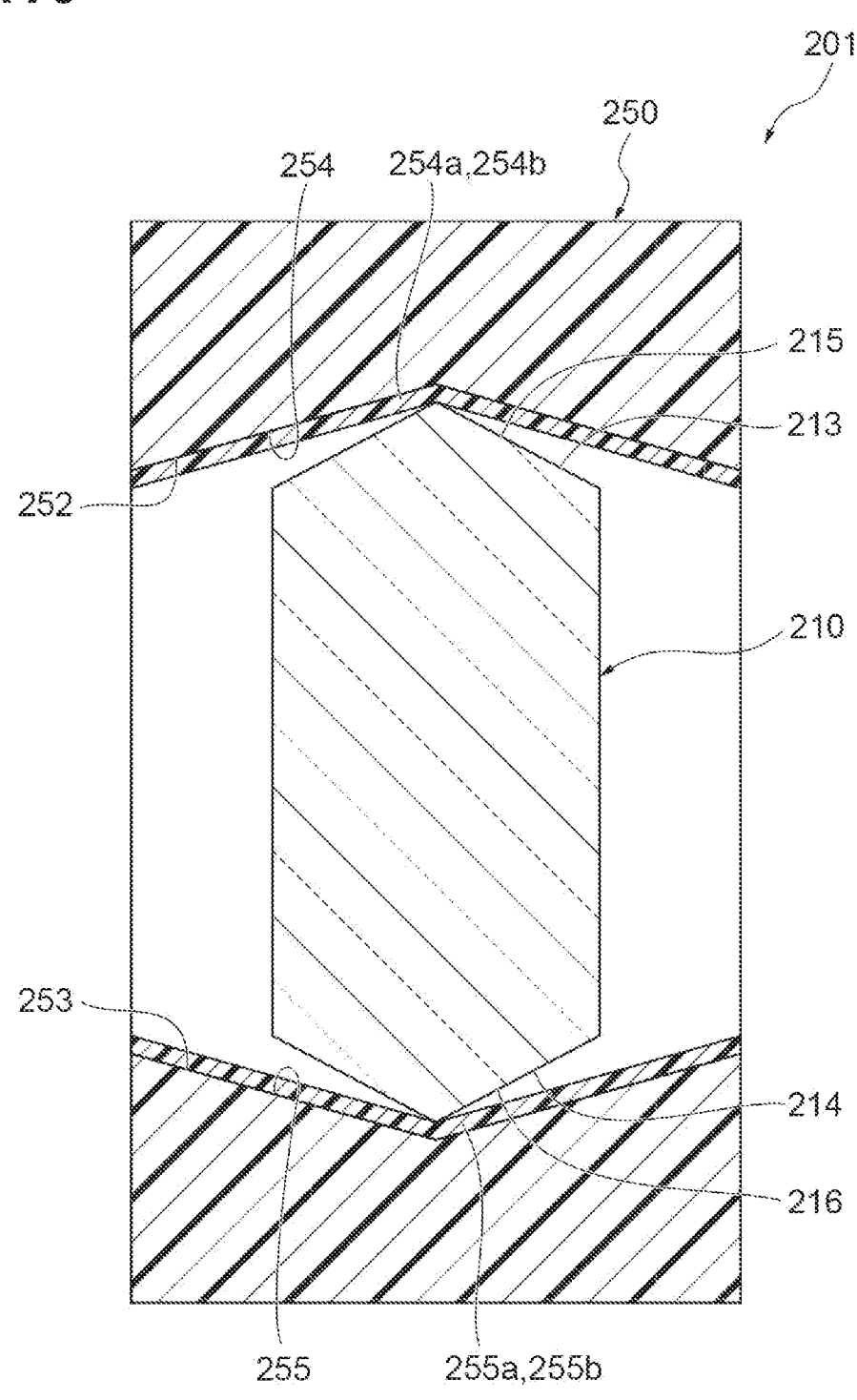
FIG. 10 is a cross-sectional view of an optical connection structure according to still another modification.

Furthermore, as illustrated in FIG. 10, in an optical connection structure 201, without providing the configurations corresponding to the positioning portions 15a and 15b and the positioning portions 16a and 16b on protruding portions 215 and 216 of side surfaces 213 and 214 of a ferrule 210, two positioning portions 254a and 254b may be provided on a recessed portion 254 formed in an inner surface 252 of an adapter 250, and two positioning portions 255a and 255b may be provided on a recessed portion 255 formed in an inner surface 253 of the adapter 250. The two positioning portions 254a and 254b and the two positioning portions 255a and 255b are, similarly to the positioning portions 15a and 15b and the positioning portions 16a and 16b of the ferrule 10, formed to be separated from each other in the longitudinal direction (Z direction, a direction orthogonal to the paper surface of FIG. 10), and formed to protrude slightly outward with respect to other portions of the inner surface 252 and the inner surface 253. Note that a basic configuration of the ferrule 210 excluding the shapes of the side surfaces is similar to the ferrule 10, and a detailed description thereof is omitted in FIG. 10.

Figure 11:
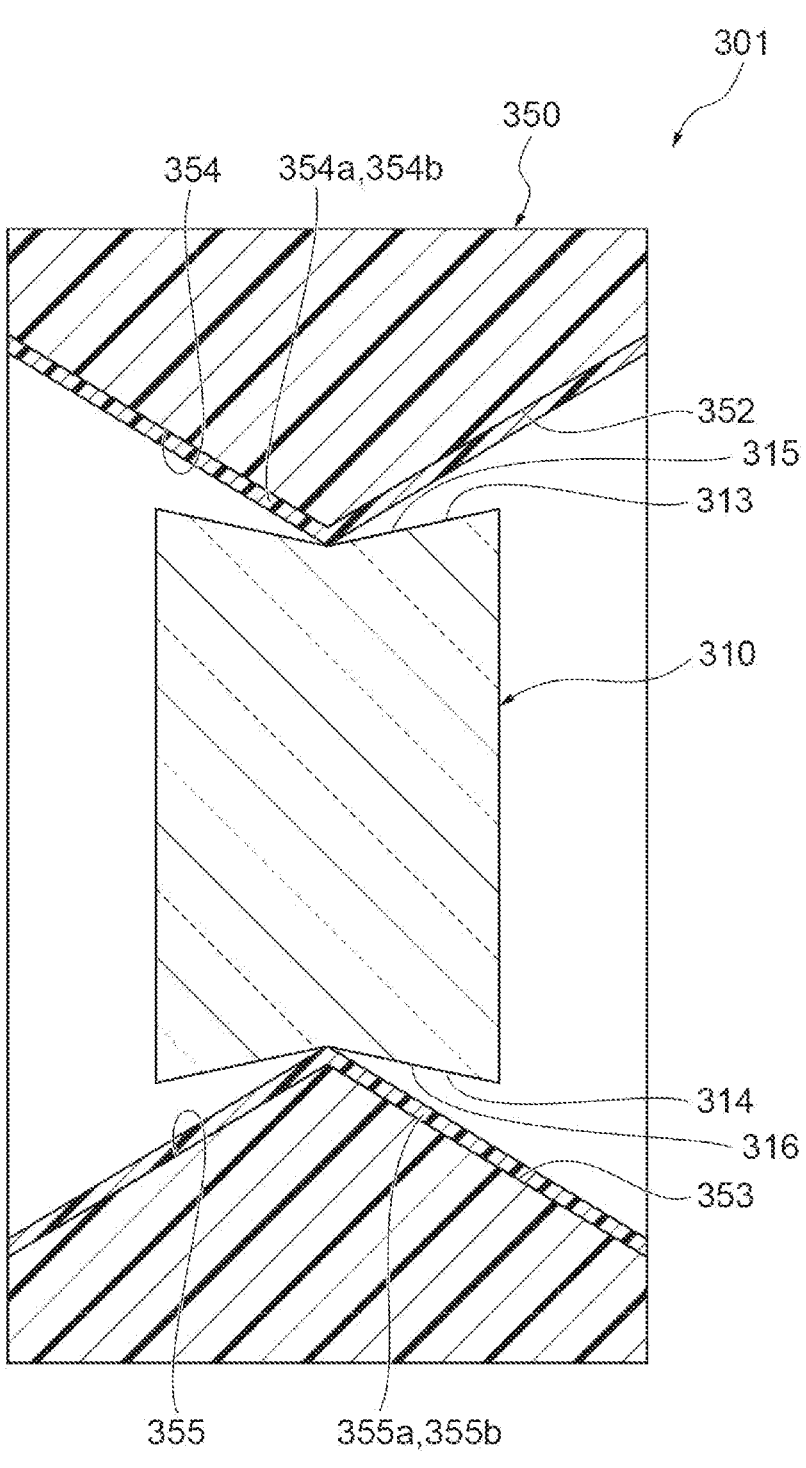
FIG. 11 is a cross-sectional view of an optical connection structure according to still another modification.

Furthermore, as illustrated in FIG. 11, in an optical connection structure 301, without providing positioning portions 15a and 15b and the positioning portions 16a and 16b on recessed portions 315 and 316 of side surfaces 313 and 314 of a ferrule 310, two positioning portions 354a and 354b may be provided on a protruding portion 354 formed on an inner surface 352 of an adapter 350, and two positioning portions 355a and 355b may be provided on a protruding portion 355 formed on an inner surface 353 of the adapter 350. The two positioning portions 354a and 354b and the two positioning portions 355a and 355b are, similarly to the positioning portions 15a and 15b and the positioning portions 16a and 16b of the ferrule 10, formed to be separated from each other in the longitudinal direction (Z direction, a direction orthogonal to the paper surface of FIG. 11), and formed to protrude slightly outward with respect to other portions (stepped portions) of the inner surfaces 352 and 353. Note that a basic configuration of the ferrule 310 excluding the shapes of the side surfaces is similar to the ferrule 10, and a detailed description thereof is omitted in FIG. 11.

Furthermore, in the present embodiment, an example in which two positioning portions are provided on one side surface or one inner surface has been described, but the number of positioning portions may be two or more on each side surface, and is not limited. For example, in any of the optical connection structures described above, three or four positioning portions may be provided on one side surface or one inner surface.

REFERENCE SIGNS LIST 1, 51, 101, 101A, 201, 301 Optical connection structure
2 Optical connector
3 Optical fiber
4 Optical fiber ribbon
5 Boot
6 Lid portion
10, 110, 110A, 210, 310 Ferrule
11 Main body portion
11a, 11b Window portion
11c Groove portion (optical fiber holding portion)
12 Flange portion
13, 113, 113A, 213, 313 Side surface (first side surface)
14, 114, 114A, 214, 314 Side surface (second side surface)
15, 315 Recessed portion (first recessed portion)
15a, 15b, 115a, 115b, 117a, 117b, 254a, 254b, 354a, 354b Positioning portion
15c, 15d, 15e Stepped portion
16, 316 Recessed portion (second recessed portion)
16a, 16b, 116a, 116b, 118a, 118b, 255a, 255b, 355a, 355b Positioning portion
16c, 16d, 16e Stepped portion
17 Front end surface
18 Rear end surface
19 Lens group or through hole
20, 50, 150, 250, 350 Adapter
21 Front end surface
22 Accommodation portion
23, 354 Protruding portion (third protruding portion)
24, 355 Protruding portion (fourth protruding portion)
25, 26 Void
52, 53, 54, 55, 152, 153, 252, 253, 352, 353 Inner surface
54a, 55a V protrusion (third protruding portion, fourth protruding portion)
54W Wall portion
56 Insertion hole
61 Hollow
115, 115A, 215 Protruding portion (first protruding portion)

116, 116A, 216 Protruding portion (second protruding portion)
154, 254 Recessed portion (third recessed portion)
155, 255 Recessed portion (fourth recessed portion)

The invention claimed is:

1. A ferrule comprising:
an optical fiber holding portion configured to hold a plurality of optical fibers; and
a first side surface and a second side surface facing each other in a second direction intersecting a first direction in which the optical fiber holding portion extends,
wherein the first side surface is provided with a first recessed portion or a first protruding portion extending along the first direction, and the second side surface is provided with a second recessed portion or a second protruding portion extending along the first direction,
wherein the first recessed portion or the first protruding portion includes a first positioning portion and a second positioning portion both of which (i) are provided on a continuous surface of the first recessed portion or of the first protruding portion, (ii) are formed to protrude from the continuous surface by a same amount, and (iii) are separated from each other in the first direction along the continuous surface by a distance greater than a width of the first positioning portion, and
wherein the first recessed portion or the first protruding portion further includes a first stepped portion located between the first positioning portion and the second positioning portion and extending along the first direction, and the first stepped portion is recessed inward of the ferrule with respect to a surface of the first positioning portion and a surface of the second positioning portion.

2. The ferrule according to claim 1,
wherein the first stepped portion is recessed in a range of 0.005 mm or more and 2 mm or less with respect to the surface of the first positioning portion and the surface of the second positioning portion.

3. The ferrule according to claim 1,
wherein the first positioning portion and the second positioning portion are separated from each other in the first direction by a distance of 1 mm or more and 10 mm or less.

4. The ferrule according to claim 1,
wherein the first positioning portion and the second positioning portion are formed inward so as to be separated from an adjacent end surface of the ferrule or an adjacent flange portion of the ferrule in the first direction by at least 0.1 mm or more.

5. The ferrule according to claim 1,
wherein the first positioning portion and the second positioning portion each have a width of 0.5 mm or more and 3 mm or less along the first direction.

6. The ferrule according to claim 1,
wherein the first positioning portion and the second positioning portion each have a V shape or a U shape in a cross section perpendicular to the first direction in a case of the first recessed portion, and have a semicircular protrusion shape or an elliptical protrusion shape in a case of the first protruding portion.

7. The ferrule according to claim 1,
wherein the second recessed portion or the second protruding portion includes a third positioning portion and a fourth positioning portion separated from each other in the first direction, and a second stepped portion located between the third positioning portion and the fourth positioning portion and extending along the first direction, the second stepped portion is recessed inward of the ferrule with respect to a surface of the third positioning portion and a surface of the fourth positioning portion.

8. The ferrule according to claim 7, wherein arrangement positions of the third positioning portion and the fourth positioning portion on the second recessed portion or the second protruding portion in the first direction correspond to arrangement positions of the first positioning portion and the second positioning portion on the first recessed portion or the first protruding portion in the first direction.

9. The ferrule according to claim 1, further comprising a first end surface and a second end surface facing each other in the first direction, wherein the first end surface is provided with a plurality of lenses or a plurality of through holes corresponding to the plurality of optical fibers, and the second end surface is provided with an opening into which the plurality of optical fibers are collectively insertable.

10. An optical connector comprising:
the ferrule according to claim 1; and
the plurality of optical fibers held in the optical fiber holding portion.

11. The ferrule according to claim 1,
wherein the first positioning portion and the second positioning portion each have an outer surface aligned along an outer surface of the first recessed portion or the first protruding portion, and the outer surface of each of the first and second positioning portions protrudes outward with respect to the outer surface of the first recessed portion or the first protruding portion.

12. The ferrule according to claim 1, wherein the first and second positioning portions have a same shape.

13. An optical connection structure comprising:
a plurality of optical fibers;
a ferrule that holds the plurality of optical fibers; and
an adapter having a tubular shape and configured such that the ferrule is inserted and fitted into the adapter such that the ferrule and another ferrule as a connection object face each other inside the tubular shape,
wherein the ferrule includes a first side surface and a second side surface facing each other in a second direction intersecting a first direction in which the ferrule is inserted into the adapter, the first side surface is provided with a first recessed portion or a first protruding portion extending along the first direction, and the second side surface is provided with a second recessed portion or a second protruding portion extending along the first direction,
wherein the adapter includes an inner surface provided with a third protruding portion fittable with the first recessed portion or a third recessed portion fittable with the first protruding portion, and a fourth protruding portion fittable with the second recessed portion or a fourth recessed portion fittable with the second protruding portion, and
wherein the first recessed portion or the first protruding portion includes a first positioning portion and a second positioning portion both of which (i) are provided on a first continuous surface of the first recessed portion or of the first protruding portion, (ii) are formed to protrude from the first continuous surface by a same amount, and (iii) are separated from each other in the first direction along the first continuous surface by a distance greater than a width of the first positioning portion, and the second recessed portion or the second protruding portion includes a third positioning portion and a fourth positioning portion both of which (i) are provided on a second continuous surface of the second recessed portion or of the second protruding portion, (ii) are formed to protrude from the second continuous surface by a same amount, and (iii) are separated from each other in the first direction along the second continuous surface by a distance greater than a width of the third positioning portion, or
the third protruding portion or the third recessed portion includes a first positioning portion and a second positioning portion both of which (i) are provided on a third continuous surface of the third protruding portion or the third recessed portion, (ii) are formed to protrude from the third continuous surface by a same amount, and (iii) are separated from each other in the first direction along the third continuous surface by a distance greater than a width of the first positioning portion, and the fourth protruding portion or the fourth recessed portion includes a third positioning portion and a fourth positioning portion both of which (i) are provided on a fourth continuous surface of the fourth protruding portion or the fourth recessed portion, (ii) are formed to protrude from the fourth continuous surface by a same amount, and (iii) are separated from each other in the first direction along the fourth continuous surface by a distance greater than a width of the third positioning portion.

14. The optical connection structure according to claim 13,
wherein, in a case where the first recessed portion or the first protruding portion includes the first positioning portion and the second positioning portion, and the second recessed portion or the second protruding portion includes the third positioning portion and the fourth positioning portion, the first recessed portion or the first protruding portion further includes a stepped portion located between the first positioning portion and the second positioning portion and extending along the first direction, and the stepped portion is recessed inward of the ferrule with respect to a surface of the first positioning portion and a surface of the second positioning portion.

15. The optical connection structure according to claim 13,
wherein, in a case where the first recessed portion or the first protruding portion includes the first positioning portion and the second positioning portion, and the second recessed portion or the second protruding portion includes the third positioning portion and the fourth positioning portion, in a plane perpendicular to the first direction, the first positioning portion and the second positioning portion are contactable with the third protruding portion or the third recessed portion, and the third positioning portion and the fourth positioning portion are contactable with the fourth protruding portion or the fourth recessed portion.

16. The optical connection structure according to claim 13,
wherein, in a case where the first recessed portion or the first protruding portion includes the first positioning portion and the second positioning portion, and the second recessed portion or the second protruding portion includes the third positioning portion and the fourth positioning portion, at least one of the third protruding portion or the third recessed portion and the fourth protruding portion or the fourth recessed portion is configured to be elastically deformable in the second direction.

17. The optical connection structure according to claim 13, wherein, in a case where the first recessed portion or the first protruding portion includes the first positioning portion and the second positioning portion, the first positioning portion and the second positioning portion each have an outer surface aligned along an outer surface of the first recessed portion or the first protruding portion, and the outer surface of each of the first and second positioning portions protrudes outward with respect to the outer surface of the first recessed portion or the first protruding portion, and in a case where the third protruding portion or the third recessed portion includes the first positioning portion and the second positioning portion, the first positioning portion and the second positioning portion each have an outer surface aligned along an outer surface of the third protruding portion or the third recessed portion, and the outer surface of each of the first and second positioning portions protrudes outward with respect to the outer surface of the third protruding portion or the third recessed portion.

18. The optical connection structure according to claim 13, wherein the first positioning portion included in the first recessed portion or the first protruding portion, and second positioning portion included in the first recessed portion or the first protruding portion, have a same shape.

19. A ferrule comprising:

an optical fiber holding portion configured to hold a plurality of optical fibers; and a first side surface and a second side surface facing each other in a second direction intersecting a first direction in which the optical fiber holding portion extends, wherein the first side surface is provided with a first recessed portion or a first protruding portion extending along the first direction, and the second side surface is provided with a second recessed portion or a second protruding portion extending along the first direction, wherein the first recessed portion or the first protruding portion includes a first positioning portion and a second positioning portion both of which (i) are provided on a continuous surface of the first recessed portion or of the first protruding portion, (ii) are formed to protrude from the continuous surface by a same amount, and (iii) are separated from each other in the first direction along the continuous surface by a distance greater than a width of the first positioning portion, and wherein the first positioning portion and the second positioning portion are formed inward so as to be separated from an adjacent end surface of the ferrule or an adjacent flange portion of the ferrule in the first direction by at least 0.1 mm or more.

\* \* \* \* \*